US010284867B2

United States Patent
Hannuksela

(10) Patent No.: US 10,284,867 B2
(45) Date of Patent: May 7, 2019

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 60 days.

(21) Appl. No.: 14/973,405

(22) Filed: Dec. 17, 2015

(65) Prior Publication Data

US 2016/0212439 A1    Jul. 21, 2016

Related U.S. Application Data

(60) Provisional application No. 62/093,950, filed on Dec. 18, 2014.

(51) Int. Cl.
*H04N 19/46* (2014.01)
*H04N 19/169* (2014.01)
(Continued)

(52) U.S. Cl.
CPC .......... *H04N 19/46* (2014.11); *H04N 19/103* (2014.11); *H04N 19/169* (2014.11);
(Continued)

(58) Field of Classification Search
CPC .... H04N 19/46; H04N 19/103; H04N 19/169; H04N 19/172; H04N 19/187;
(Continued)

(56) References Cited

U.S. PATENT DOCUMENTS

2013/0195201 A1* 8/2013 Boyce .................... H04N 19/44
375/240.25
2014/0003489 A1    1/2014 Hannuksela
(Continued)

FOREIGN PATENT DOCUMENTS

EP          2840787 A1    2/2015
WO    2012/099529 A1    7/2012
(Continued)

OTHER PUBLICATIONS

Wu et al., "Indication of the End of Coded Data for Pictures and Partial-Picture Regions", Joint Collaborative Team on Video Coding (JCT-VC) of ITU-T SG 16 WP 3 and ISO/IEC JTC 1/SC 29/WG 11, JCTVC-S0148, 19th Meeting, Oct. 17-24, 2014, pp. 1-3.
(Continued)

*Primary Examiner* — Christopher S Kelley
*Assistant Examiner* — Kathleen M Walsh
(74) *Attorney, Agent, or Firm* — Alston & Bird LLP

(57) ABSTRACT

A method and related apparatus, the method comprising receiving a bitstream comprising picture data units on one or more scalability layers; determining a first set of layers that are decoded from the bitstream; decoding, from or along the bitstream, a first indication indicative of an end of a coded picture, wherein the first indication is associated with a first layer identifier; decoding, from or along the bitstream, a second indication indicative of a second set of layers that are not present in an access unit; and determining an end of the access unit, when the first layer identifier is the greatest among the first set of layers, or all layers with a layer identifier greater than the first identifier among the first set of layers are included in the second set of layers.

20 Claims, 11 Drawing Sheets

(51) Int. Cl.
*H04N 19/187* (2014.01)
*H04N 19/30* (2014.01)
*H04N 19/70* (2014.01)
*H04N 19/103* (2014.01)
*H04N 19/172* (2014.01)
*H04N 19/33* (2014.01)
*H04N 19/44* (2014.01)
*H04N 19/593* (2014.01)
*H04N 19/61* (2014.01)
*H04N 21/2343* (2011.01)
*H04N 21/647* (2011.01)

(52) U.S. Cl.
CPC ......... *H04N 19/172* (2014.11); *H04N 19/187* (2014.11); *H04N 19/30* (2014.11); *H04N 19/33* (2014.11); *H04N 19/44* (2014.11); *H04N 19/593* (2014.11); *H04N 19/70* (2014.11); *H04N 19/61* (2014.11); *H04N 21/234327* (2013.01); *H04N 21/64792* (2013.01)

(58) Field of Classification Search
CPC ........ H04N 19/30; H04N 19/33; H04N 19/44; H04N 19/593; H04N 19/61; H04N 19/70; H04N 21/2343; H04N 21/234327; H04N 21/2662; H04N 21/64792
USPC .................................................... 375/240.25
See application file for complete search history.

(56) References Cited

U.S. PATENT DOCUMENTS

| | | | | |
|---|---|---|---|---|
| 2014/0086303 | A1* | 3/2014 | Wang | H04N 19/70 375/240.02 |
| 2015/0103886 | A1* | 4/2015 | He | H04N 19/188 375/240.02 |
| 2015/0103926 | A1 | 4/2015 | Hannuksela | |
| 2015/0131744 | A1* | 5/2015 | Samuelsson | H04N 19/70 375/240.26 |
| 2015/0264404 | A1 | 9/2015 | Hannuksela | |
| 2015/0271526 | A1* | 9/2015 | Hendry | H04N 19/24 375/240.26 |
| 2016/0249056 | A1* | 8/2016 | Tsukuba | H04N 19/70 |
| 2016/0381393 | A1* | 12/2016 | Tsukuba | H04N 19/30 375/240.12 |

FOREIGN PATENT DOCUMENTS

| | | |
|---|---|---|
| WO | 2014/106692 A1 | 7/2014 |
| WO | 2014/167817 A1 | 10/2014 |
| WO | 2015/104451 A1 | 7/2015 |

OTHER PUBLICATIONS

Wenger et al., "RTP Payload Format for Scalable Video Coding", Internet Engineering Task Force, RFC 6190, May 2011, 100 pages.

Schulzrinne et al., "RTP: A Transport Protocol for Real-Time Applications", Network Working Group, RFC 3550, Jul. 2003, pp. 1-92.

"Information technology—Generic coding of moving pictures and associated audio information: Systems", Series H: Audiovisual and Multimedia Systems, Infrastructure of audiovisual services—Transmission multiplexing and synchronization, Recommendation ITU-T H.222.0, Jun. 2012, pp. 1-228.

"Information Technology—Coding of Audio-Visual Objects—Part 12: ISO Base Media File Format", ISO/IEC 14496-12, Third edition, Oct. 15, 2008, 120 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 13)", 3GPP TS 26.244, V13.2.0, Sep. 2015, pp. 1-66.

"Video Coding for Low Bit Rate Communication", Series H: Audiovisual and Multimedia Systems, Infrastructure of audiovisual services—Coding of moving video, Recommendation ITU-T H163, Jan. 2005, 226 pages.

"Advanced Video Coding for Generic Audiovisual Services", Series H: Audiovisual and Multimedia Systems, Infrastructure of audio-visual services—Coding of moving video, Recommendation ITU-T H.264, Feb. 2014, 790 pages.

"High Efficiency Video Coding", Series H: Audiovisual and Multimedia Systems, Infrastructure of audiovisual services—Coding of moving video, Recommendation ITU-T H.265, Oct. 2014, 540 pages.

"Parameter Values for Ultra-High Definition Television Systems for Production and International Programme Exchange", Recommendation ITU-R BT.2020-2, Oct. 2015, 8 pages.

"Parameter Values for the HDTV Standards for Production and International Programme Exchange", Recommendation ITU-R BT.709-6, Jun. 2015, 19 pages.

International Search Report and Written Opinion received for corresponding Patent Cooperation Treaty Application No. PCT/IB2015/059746, dated Apr. 14, 2016, 17 pages.

Wang et al., "System and Transport Interface of SVC", IEEE Transactions on Circuits and Systems for Video Technology, vol. 17, No. 9, Sep. 2007, pp. 1149-1163.

* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Scalable video coding refers to coding structure where one bitstream can contain multiple representations of the content at different bitrates, resolutions or frame rates. In these cases the receiver can extract the desired representation depending on its characteristics. Alternatively, a server or a network element can extract the portions of the bitstream to be transmitted to the receiver depending on e.g. the network characteristics or processing capabilities of the receiver. A scalable bitstream typically consists of a base layer providing the lowest quality video available and one or more enhancement layers that enhance the video quality when received and decoded together with the lower layers. In order to improve coding efficiency for the enhancement layers, the coded representation of that layer typically depends on the lower layers.

The bitstream format of H.264/AVC or H.265/HEVC does not include an indication of an end of an access unit. Consequently, the end of an access unit may have to be concluded based on the detection of the start of the next access unit. In low-latency applications, data from which the start of the next access unit can be concluded may be received significantly later, e.g. after one picture delay.

In the multi-layer H.265/HEVC extensions, such as SHVC and MV-HEVC, it is not required to include a picture unit in each layer consistently in each access unit. In other words, there may be a picture unit at layer A in one access unit but in another access unit no picture unit at layer A may be present. It is therefore not possible to conclude from the layer identifier values of a picture unit whether it is the last picture unit of an access unit.

A further problem arises from the fact that a multi-layer bitstream may be subject to layer extraction in the sender and/or in one or more gateways or alike. An indication of an end of an access unit should be resilient to layer extractions so that decoders can conclude an end of access unit reliably even if the bitstream has been subject to layer extraction. Particularly, if the highest layer(s) of the bitstream are extracted out from the bitstream, decoders should still have means to conclude an end of an access unit.

SUMMARY

Now in order to at least alleviate the above problems, methods for encoding and decoding an indication of an end of an access unit are introduced herein.

A method according to a first embodiment comprises
receiving a bitstream comprising picture data units on one or more scalability layers;
determining a first set of layers that are decoded from the bitstream;
decoding, from or along the bitstream, a first indication indicative of an end of a coded picture, wherein the first indication is associated with a first layer identifier;
decoding, from or along the bitstream, a second indication indicative of a second set of layers that are not present in an access unit; and
determining an end of the access unit, when the first layer identifier is the greatest among the first set of layers, or all layers with a layer identifier greater than the first identifier among the first set of layers are included in the second set of layers.

According to an embodiment, the first indication and the second indication are decoded from the same syntax structure.

According to an embodiment, the first indication and the second indication are decoded from different syntax structures.

According to an embodiment, the method further comprises decoding the first indication from a specific NAL unit or an SEI message in a suffix SEI NAL unit.

According to an embodiment, the method further comprises decoding the second indication from one or more of the following syntax structures:
A specific NAL unit;
An SEI message;
A VCL NAL unit syntax structure, such as slice segment header extension data bytes;
An access unit delimiter NAL unit;
A picture header syntax structure.

According to an embodiment, the method further comprises
decoding the second indication as indicating layers that may be present in the access unit; and
determining absent layers as those layers that not listed as allowed to be present and having a layer identifier value greater than that associated with the second indication.

According to an embodiment, interpretation of the second indication depends on the information in the video parameter set, such as which layers may be present in the bitstream or layer dependency information.

According to an embodiment, the second indication indicates layer sets for which the associated picture unit is the last picture unit in the access unit.

According to an embodiment, the second indication comprises a greatest layer identifier value within a layer subtree and indicates that the greatest layer identifier value and all its reference layers may be present in the access unit.

According to an embodiment, the second indication comprises layer-wise indication which layers may be present and/or absent in the access unit.

According to an embodiment, the end of an access unit is determined as a response to determining that the access unit is decoded.

According to an embodiment, the end of an access unit is determined as a response to determining that each sub-layer non-reference picture of the access unit with TemporalId is equal to the highest TemporalId that is being decoded is marked as "unused for reference".

According to an embodiment, the end of an access unit is determined as a response to detecting if decoded pictures of the access unit from all output layers are available and intended for output from the decoding process, and as a response to one or more pictures of output layers not being available or not intended for output, determining if and which pictures from alternative output layer(s) are output.

An apparatus according to a second embodiment comprises:
at least one processor and at least one memory, said at least one memory stored with code thereon, which when executed by said at least one processor, causes an apparatus to perform at least
receiving a bitstream comprising picture data units on one or more scalability layers;

determining a first set of layers that are decoded from the bitstream;

decoding, from or along the bitstream, a first indication indicative of an end of a coded picture, wherein the first indication is associated with a first layer identifier;

decoding, from or along the bitstream, a second indication indicative of a second set of layers that are not present in an access unit; and determining an end of the access unit, when the first layer identifier is the greatest among the first set of layers, or all layers with a layer identifier greater than the first identifier among the first set of layers are included in the second set of layers.

According to a third embodiment there is provided a computer readable storage medium stored with code thereon for use by an apparatus, which when executed by a processor, causes the apparatus to perform:

receiving a bitstream comprising picture data units on one or more scalability layers;

determining a first set of layers that are decoded from the bitstream;

decoding, from or along the bitstream, a first indication indicative of an end of a coded picture, wherein the first indication is associated with a first layer identifier;

decoding, from or along the bitstream, a second indication indicative of a second set of layers that are not present in an access unit; and determining an end of the access unit, when the first layer identifier is the greatest among the first set of layers, or all layers with a layer identifier greater than the first identifier among the first set of layers are included in the second set of layers.

According to a fourth embodiment there is provided an apparatus comprising a video decoder configured for decoding a bitstream comprising an image sequence, the video decoder comprising means for receiving a bitstream comprising picture data units on one or more scalability layers;

means for determining a first set of layers that are decoded from the bitstream;

means for decoding, from or along the bitstream, a first indication indicative of an end of a coded picture, wherein the first indication is associated with a first layer identifier;

means for decoding, from or along the bitstream, a second indication indicative of a second set of layers that are not present in an access unit; and means for determining an end of the access unit, when the first layer identifier is the greatest among the first set of layers, or all layers with a layer identifier greater than the first identifier among the first set of layers are included in the second set of layers.

According to a fifth embodiment there is provided a video decoder configured for decoding a bitstream comprising an image sequence, wherein said video decoder is further configured for:

receiving a bitstream comprising picture data units on one or more scalability layers;

determining a first set of layers that are decoded from the bitstream;

decoding, from or along the bitstream, a first indication indicative of an end of a coded picture, wherein the first indication is associated with a first layer identifier;

decoding, from or along the bitstream, a second indication indicative of a second set of layers that are not present in an access unit; and determining an end of the access unit, when the first layer identifier is the greatest among the first set of layers, or all layers with a layer identifier greater than the first identifier among the first set of layers are included in the second set of layers.

A method according to a sixth embodiment comprises encoding a coded picture as a part of an access unit into a bitstream;

encoding a first indication indicative of an end of the coded picture into or along the bitstream, wherein the first indication is associated with a first layer identifier; and encoding a second indication indicative of a second set of layers that are not present in the access unit into or along the bitstream.

According to an embodiment, the first indication and the second indication are included in the same syntax structure.

According to an embodiment, the first indication and the second indication are included in different syntax structures.

According to an embodiment, the second indication is included both in a syntax structure different from that containing the first indication and in the same syntax structure that also contains the first indication.

According to an embodiment, the method further comprises encoding the first indication as a specific NAL unit or an SEI message in a suffix SEI NAL unit.

According to an embodiment, the method further comprises encoding the second indication into one or more of the following syntax structures:

A specific NAL unit, which is allowed to be the last NAL unit of a picture unit;

An SEI message, which may be included in a suffix SEI NAL unit;

A VCL NAL unit syntax structure, such as slice segment header extension data bytes;

An access unit delimiter NAL unit;

A picture header syntax structure.

According to an embodiment, the method further comprises encoding the second indication to indicate layers that may be present in the access unit; and determining absent layers as those layers that not listed as allowed to be present and having a layer identifier value greater than that associated with the second indication.

According to an embodiment, interpretation of the second indication may depend on the information in the video parameter set, such as which layers may be present in the bitstream or layer dependency information.

According to an embodiment, the second indication indicates layer sets for which the associated picture unit is the last picture unit in the access unit.

According to an embodiment, the second indication comprises a greatest layer identifier value within a layer subtree and indicates that the greatest layer identifier value and all its reference layers may be present in the access unit.

According to an embodiment, the second indication comprises layer-wise indication which layers may be present and/or absent in the access unit.

An apparatus according to a seventh embodiment comprises:

at least one processor and at least one memory, said at least one memory stored with code thereon, which when executed by said at least one processor, causes an apparatus to perform at least encoding a coded picture as a part of an access unit into a bitstream;

encoding a first indication indicative of an end of the coded picture into or along the bitstream, wherein the first indication is associated with a first layer identifier; and encoding a second indication indicative of a second set of layers that are not present in the access unit into or along the bitstream.

According to an eighth embodiment there is provided a computer readable storage medium stored with code thereon for use by an apparatus, which when executed by a processor, causes the apparatus to perform:

encoding a coded picture as a part of an access unit into a bitstream;

encoding a first indication indicative of an end of the coded picture into or along the bitstream, wherein the first indication is associated with a first layer identifier; and encoding a second indication indicative of a second set of layers that are not present in the access unit into or along the bitstream.

According to a ninth embodiment there is provided an apparatus comprising a video encoder configured for decoding a bitstream comprising an image sequence, the video encoder comprising means for encoding a coded picture as a part of an access unit into a bitstream;

means for encoding a first indication indicative of an end of the coded picture into or along the bitstream, wherein the first indication is associated with a first layer identifier; and means for encoding a second indication indicative of a second set of layers that are not present in the access unit into or along the bitstream.

According to a tenth embodiment there is provided a video encoder configured for decoding a bitstream comprising an image sequence, wherein said video encoder is further configured for:

encoding a coded picture as a part of an access unit into a bitstream;

encoding a first indication indicative of an end of the coded picture into or along the bitstream, wherein the first indication is associated with a first layer identifier; and encoding a second indication indicative of a second set of layers that are not present in the access unit into or along the bitstream

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
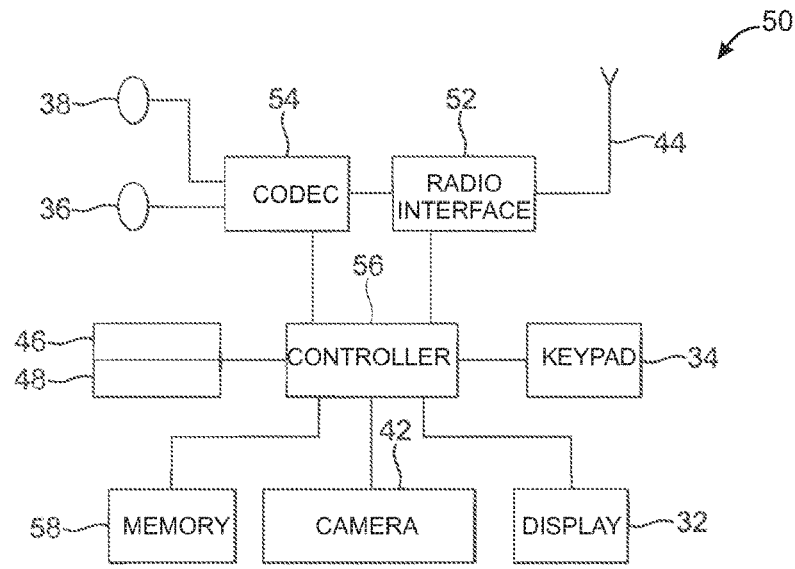
FIG. 1 shows schematically an electronic device employing embodiments of the invention.
Figure 2:
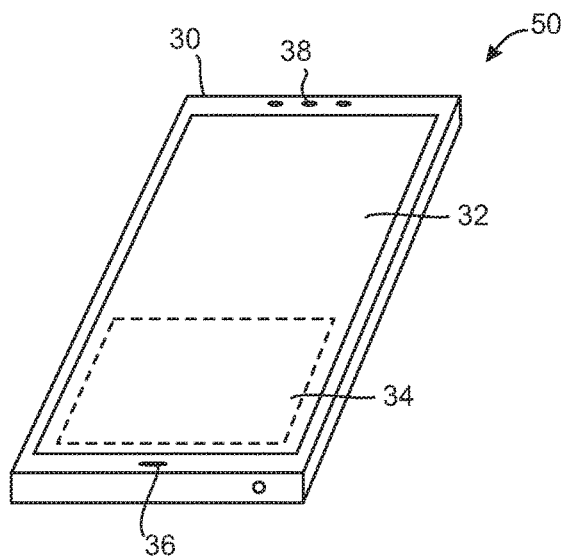
FIG. 2 shows schematically a user equipment suitable for employing embodiments of the invention.

The following describes in further detail suitable apparatus and possible mechanisms for encoding an enhancement layer sub-picture without significantly sacrificing the coding efficiency. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
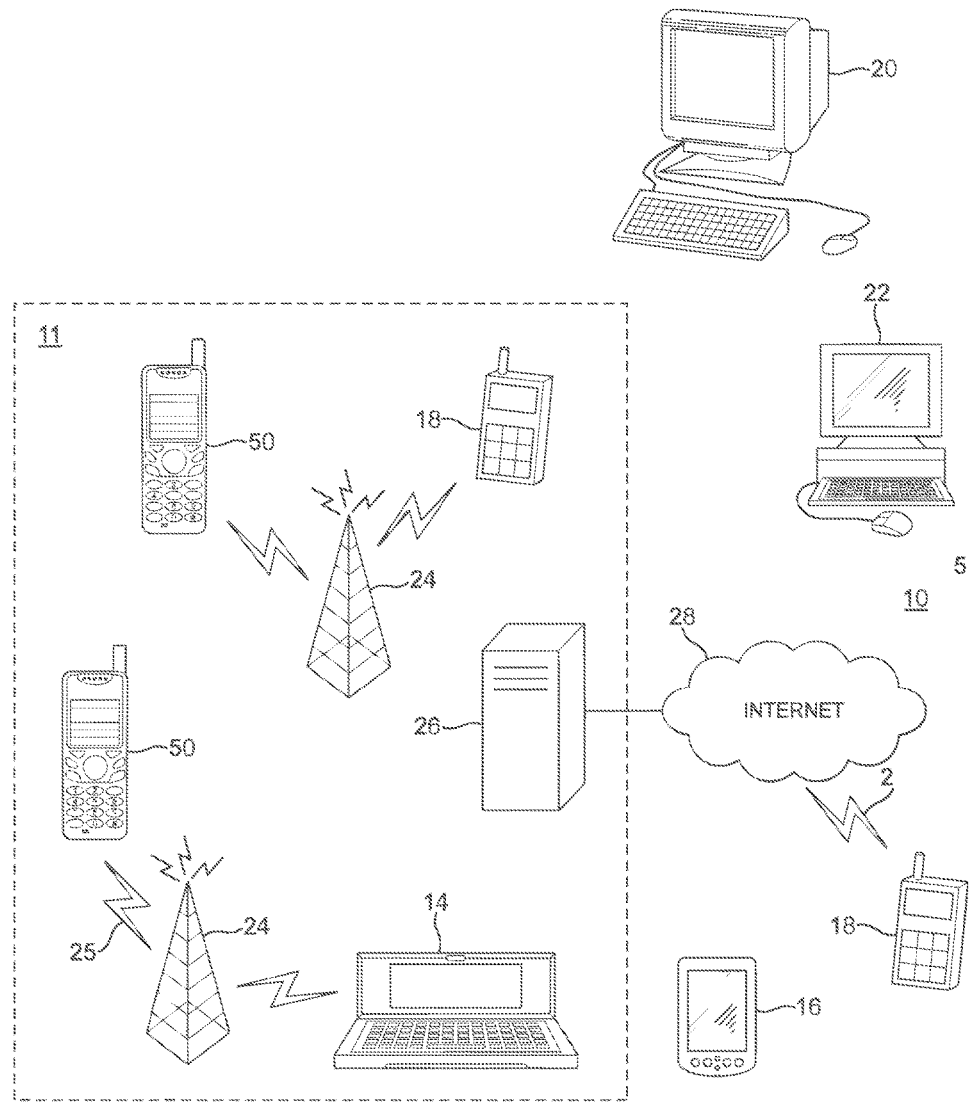
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session. An RTP stream may be regarded as a logical channel.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format). A track may be regarded as a logical channel.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
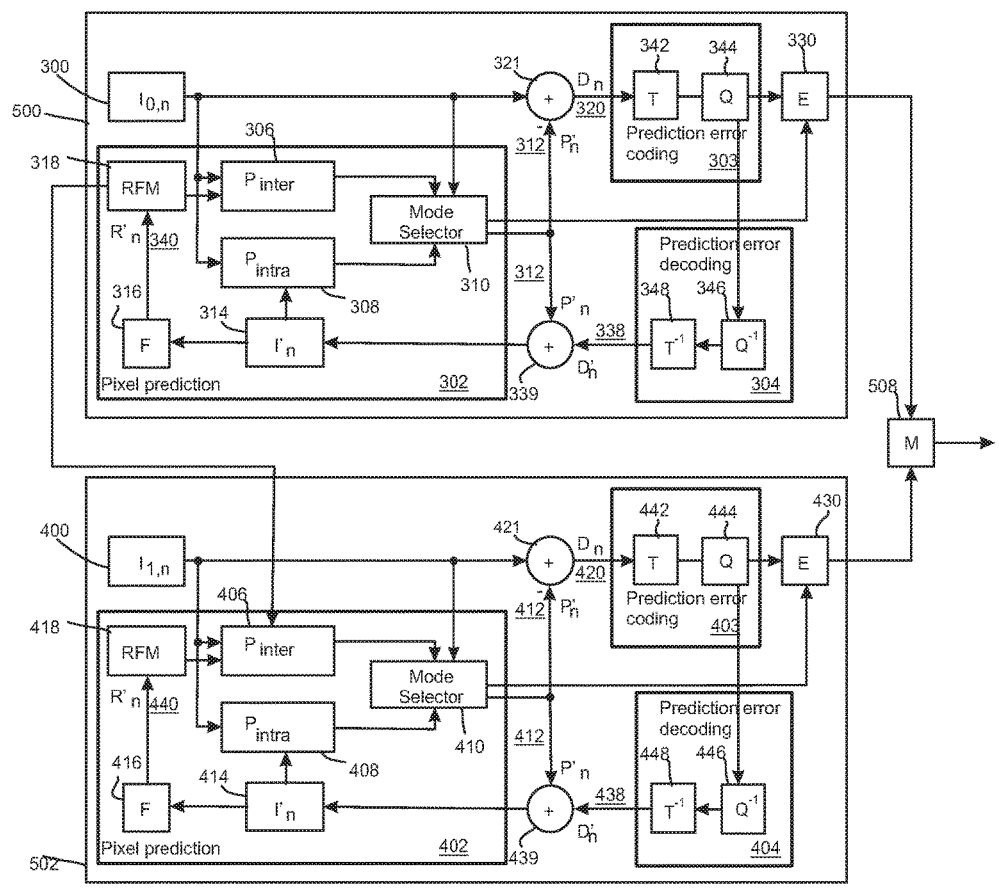
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RB SP stop bit and followed by zero or more subsequent bits equal to 0.

NAL units consist of a header and payload. In H.264/AVC and HEVC, the NAL unit header indicates the type of the NAL unit H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17 18 | BLA_W_LP BLA_W_DLP (a.k.a. IDR_W_RADL) BLA_N_LP | Coded slice segment of a BLA picture slice_segment_layer_rbsp( ) |
| 19, | IDR_W_DLP (a.k.a. | Coded slice segment of an IDR |

| nal_unit_type | Name of nal_unit_type | Content of NAL unit and RBSP syntax structure |
|---|---|---|
| 20 | IDR_W_RADL) IDR_N_LP | picture slice_segment_layer_rbsp( ) |
| 21 | CRA_NUT | Coded slice segment of a CRA picture slice_segment_layer_rbsp( ) |
| 22, 23 | RSV_IRAP_VCL22 ... RSV_IRAP_VCL23 | Reserved // reserved RAP VCL NAL unit types |
| 24 ... 31 | RSV_VCL24 ... RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimeter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

Said specified classification rule may be specified for example as follows. The first access unit in the bitstream starts with the first NAL unit of the bitstream. A VCL NAL unit is the first VCL NAL unit of an access unit, when all of the following conditions are true:

The slice contained in the VCL NAL units is the first slice of a coded picture, which in HEVC is equivalent to the condition that first_slice_segment_in_pic_flag is equal to 1.

The previous coded picture in decoding order belongs to a difference access unit, which in HEVC multi-layer extensions correspond to at least one of the following conditions being true:

The previous picture in decoding order belongs to a different POC resetting period than the picture containing the VCL NAL unit.

PicOrderCntVal derived for the VCL NAL unit differs from the PicOrderCntVal of the previous picture in decoding order.

The first of the NAL units that are allowed, by NAL unit specifications, to appear in the access unit before the first VCL NAL unit firstVclNalUnitInAu of the access unit in decoding order and that follows the last VCL NAL unit of the preceding access unit, in decoding order, starts the access unit. In HEVC, the first of any of the following NAL units preceding the first VCL NAL unit firstVclNalUnitInAu and succeeding the last VCL NAL unit preceding firstVcl-NalUnitInAu, if any, specifies the start of a new access unit:

Access unit delimiter NAL unit (when present).
VPS NAL unit (when present)
SPS NAL unit (when present)
PPS NAL unit (when present)
Prefix SEI NAL unit (when present)
NAL units with nal_unit_type in the range of RSV_N-VCL41 . . . RSV_NVCL44 (when present)
NAL units with nal_unit_type in the range of UNSPEC48 . . . UNSPEC55 (when present)

When there is none of the above NAL units preceding firstVclNalUnitInAu and succeeding the last VCL NAL unit preceding firstVclNalUnitInAu, if any, firstVclNalUnitInAu starts a new access unit.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit.

It may be required that the order of the coded pictures and non-VCL NAL units within an access unit obeys certain constraint such as the following specified for HEVC multi-layer extensions:

When an access unit delimiter NAL unit is present, it shall be the first NAL unit. There shall be at most one access unit delimiter NAL unit in any access unit.

When any VPS NAL units, SPS NAL units, PPS NAL units, prefix SEI NAL units, NAL units with nal_unit_type in the range of RSV_NVCL41 . . . RSV_NVCL44, or NAL units with nal_unit_type in the range of UNSPEC48 . . . UNSPEC55 are present, they shall not follow the last VCL NAL unit of the access unit.

NAL units having nal_unit_type equal to FD_NUT or SUFFIX_SEI_NUT, or in the range of RSV_NVCL45 . . . RSV_NVCL47 or UNSPEC56 . . . UNSPEC63 shall not precede the first VCL NAL unit of the access unit.

When an end of sequence NAL unit with nuh_layer_id nuhLayerId is present, it shall be the last NAL unit with nuh_layer_id equal to nuhLayerId in the access unit other than an end of bitstream NAL unit (when present).

When an end of bitstream NAL unit is present, it shall be the last NAL unit in the access unit.

In HEVC, picture unit may be defined as a set of NAL units that contain all VCL NAL units of a coded picture and their associated non-VCL NAL units. An associated VCL NAL unit for a non-VCL NAL unit may be defined as the preceding VCL NAL unit, in decoding order, of the non-VCL NAL unit for certain types of non-VCL NAL units and the next VCL NAL unit, in decoding order, of the non-VCL NAL unit for other types of non-VCL NAL units. An associated non-VCL NAL unit for a VCL NAL unit may be defined to be the a non-VCL NAL unit for which the VCL NAL unit is the associated VCL NAL unit. For example, in HEVC, an associated VCL NAL unit may be defined as the preceding VCL NAL unit in decoding order for a non-VCL NAL unit with nal_unit_type equal to EOS_NUT, EOB_NUT, FD_NUT, or SUFFIX_SEI_NUT, or in the ranges of RSV_NVCL45 . . . RSV_NVCL47 or UNSPEC56 . . . UNSPEC63; or otherwise the next VCL NAL unit in decoding order.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an IRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multilayer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exists several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding, in decoding order, the IRAP picture from which the decoding of a layer can be started. These pictures that may be omitted may be specifically labeled by the encoder or another entity within the bitstream. For example, one or more specific NAL unit types may be used for them. These pictures, regardless of whether they are specifically marked with a NAL unit type or inferred e.g. by the decoder, may be referred to as cross-layer random access skip (CL-RAS) pictures. The decoder may omit the output of the generated unavailable pictures and the decoded CL-RAS pictures.

A layer-wise start-up mechanism may start the output of enhancement layer pictures from an IRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output by the decoder, while other pictures preceding such an IRAP picture, such as RASL pictures associated with the IRAP picture, might not be output by the decoder and/or might not be displayed.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content.

Scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s).

Indication(s) may exist in the bitstream syntax to indicate triggering of a layer-wise start-up process. These indication(s) may be generated by encoders or splicers and may be obeyed by decoders. These indication(s) may be used for particular picture type(s) or NAL unit type(s) only, such as only for IDR pictures, or may be used for any picture type(s). Without loss of generality, an indication called cross_layer_bla_flag that is considered to be included in a slice segment header is referred to below. It should be understood that a similar indication with any other name or included in any other syntax structures could be additionally or alternatively used.

Independently of indication(s) triggering a layer-wise start-up process, certain NAL unit type(s) and/or picture type(s) may trigger a layer-wise start-up process. For example, a base-layer BLA picture may trigger a layer-wise start-up process.

A layer-wise start-up mechanism may be initiated in one or more of the following cases:

At the beginning of a bitstream.
At the beginning of a coded video sequence, when specifically controlled, e.g. when a decoding process is started or re-started e.g. as response to tuning into a broadcast or seeking to a position in a file or stream. The decoding process may input an variable, e.g. referred to as NoClrasOutputFlag, that may be controlled by external means, such as the video player or alike.
A base-layer BLA picture.
A base-layer IDR picture with cross_layer_bla_flag equal to 1. (Or a base-layer IRAP picture with cross_layer_bla_flag equal to 1.)
A base-layer CRA picture with HandleCraAsBlaFlag equal to 1, where the decoding process inputs variable HandleCraAsBlaFlag that may be controlled by external means.

When a layer-wise start-up mechanism is initiated, the decoding process may set variables accordingly. For example, the variable NoClrasOutputFlag may be set equal to 1.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation, or, when the access unit where NoClrasOutputFlag is set equal to 1 contains IRAP pictures in all layers, indicates a start of decoding where all layers are decoded conventionally When a layer-wise start-up mechanism is initiated, all pictures in the DPB may be marked as "unused for reference". In other words, all pictures in all layers may be marked as "unused for reference" and will not be used as a reference for prediction for the picture initiating the layer-wise start-up mechanism or any subsequent picture in decoding order.

A decoding process for layer-wise start-up may be for example controlled by two array variables LayerInitializedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there 63 layers are enabled (e.g. with a 6-bit nuh_layer_id), the variables may be reset as follows: the variable LayerInitializedFlag[i] is set equal to 0 for all values of i from 0 to 62, inclusive, and the variable FirstPicInLayerDecodedFlag[i] is set equal to 0 for all values of i from 1 to 62, inclusive.

The decoding process may include the following or similar to control the output of RASL pictures. When the current picture is an IRAP picture, the following applies:
If LayerInitializedFlag[nuh_layer_id] is equal to 0, the variable NoRaslOutputFlag is set equal to 1.
Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
Otherwise, the variable HandleCraAsBlaFlag is set equal to 0 and the variable NoRaslOutputFlag is set equal to 0.

The decoding process may include the following to update the LayerinitializedFlag for a layer. When the current picture is an IRAP picture and either one of the following is true, LayerInitializedFlag[nuh_layer_id] is set equal to 1.
nuh_layer_id is equal to 0.
LayerInitializedFlag[nuh_layer_id] is equal to 0 and LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitializedFlag[layerId] is equal to 0. In HRD operations, CL-RAS pictures may need to be taken into consideration in derivation of CPB arrival and removal times. Decoders may ignore any CL-RAS pictures, as these pictures are not specified for output and have no effect on the decoding process of any other pictures that are specified for output.

Cross-layer random access skipped (CL-RAS) pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

CL-RAS pictures may be inferred. For example, a picture with nuh_layer_id equal to layerId may be inferred to be a CL-RAS picture when the LayerInitializedFlag[layerId] is equal to 0. A CL-RAS picture may be defined as a picture with nuh_layer_id equal to layerId such that LayerInitializedFlag[layerId] is equal to 0 when the decoding of a coded picture with nuh_layer_id greater than 0 is started.

A layer tree may be defined as a set of layers such that each layer in the set of layers is a direct or indirect predicted layer or a direct or indirect reference layer of at least one other layer in the set of layers and no layer outside the set of layers is a direct or indirect predicted layer or a direct or indirect reference layer of any layer in the set of layers. A direct predicted layer may be defined as a layer for which another layer is a direct reference layer. A direct reference layer may be defined as a layer that may be used for inter-layer prediction of another layer for which the layer is the direct reference layer. An indirect predicted layer may be defined as a layer for which another layer is an indirect reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An independent layer may be defined as a layer that does not have any direct reference layers. A base layer may be defined as a layer that has the lowest possible layer identifier value. For example, in HEVC a base layer may be defined as a layer with nuh_layer_id equal to 0. An independent non-base layer may be defined as a layer that is an independent layer but is not the base layer.

Alternatively, a layer tree may be defined as a set of layers where each layer has an inter-layer prediction relation with at least one other layer in the layer tree and no layer outside the layer tree has an inter-layer prediction relation with any layer in the layer tree.

A layer subtree may be defined as a subset of the layers of a layer tree including all the reference layers of the layers within the subset.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming.

The HEVC standard (version 2) includes three sub-bitstream extraction processes. The sub-bitstream extraction process in clause 10 of the HEVC standard is identical to that in clause F.10.1 except that the bitstream conformance requirements for the resulting sub-bitstream are relaxed in clause F.10.1 so that it can be used also for bitstream where the base layer is external (in which case vps_base_layer_internal_flag is equal to 0) or not available (in which case vps_base_layer_available_flag is equal to 0). VCL NAL units with nuh_layer_id equal to 0 are not present in a bitstream with vps_base_layer_available_flag equal to 0, and the layer with the lowest nuh_layer_id value may be treated like a base layer in semantics and/or decoding process. Clause F.10.3 of the HEVC standard (version 2) specifies a sub-bitstream extraction process for additional layer sets, resulting into a sub-bitstream that does not contain the base layer. All three sub-bitstream extraction processes operate similarly: the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values. Clause F.10.3 handles NAL units of certain types and with nuh_layer_id equal to 0 specially and also sets the value of vps_base_layer_available_flag in VPSs. The process of clause F.10.3 may be specified as follows:

The output bitstream outBitstream is set to be identical to the input bitstream inBitstream.

NAL units with nal_unit_type not equal to VPS_NUT, SPS_NUT, PPS_NUT, EOS_NUT, and EOB_NUT and with nuh_layer_id not equal to any value in the input list of nuh_layer_id values, LayerIdListTarget, are removed from outBitstream.

NAL units with nal_unit_type equal to VPS_NUT, SPS_NUT, PPS_NUT, or EOS_NUT with nuh_layer_id not equal to 0 or any value in LayerIdListTarget are removed from outBitstream.

All NAL units with TemporalId greater than the input TemporalId, tIdTarget, are removed from outBitstream.

vps_base_layer_available_flag in each VPS is set equal to 0.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

The VPS of HEVC specifies layer sets and HRD parameters for these layer sets. A layer set may be used as the target layer identifier list in the sub-bitstream extraction process. In HEVC, a layer set may be defined as set of layers represented within a bitstream created from another bitstream by operation of the sub-bitstream extraction process with the another bitstream, the target highest TemporalId equal to 6, and the target layer identifier list equal to the layer identifier list associated with the layer set as inputs.

An additional layer set may be defined as a set of layers of a bitstream with a set of layers of one or more non-base layer subtrees. An additional layer set may be understood as a set of layers that do not depend on layers excluded from the additional layer set. In HEVC, the VPS syntax specified in HEVC version 1 does not enable indication of additional layer set, i.e. the base layer is required to be present in the layer sets indicated in the VPS specified in HEVC version 1. The VPS extension syntax specified in HEVC version 2 enables indicating additional layer sets.

Layer sets and additional layer sets may be treated equivalently, when it comes to using them e.g. in deriving and indicating output layer sets. Unless otherwise indicated by the context the term layer set may be understood below as a collective term covering both the term layer set and the term additional layer set, as defined above.

An output layer may be defined as a layer whose decoded pictures are output by the decoding process. The output layers may depend on which subset of the multi-layer bitstream is decoded. The pictures output by the decoding process may be further processed, e.g. a color space conversion from the YUV color space to RGB may be performed, and they may be displayed. However, further processing and/or displaying may be considered to be processes external of the decoder and/or the decoding process and might not take place.

In multi-layer video bitstreams, an operation point definition may include a consideration a target output layer set. For example, an operation point may be defined as a bitstream that is created from another bitstream by operation of the sub-bitstream extraction process with the another bitstream, a target highest temporal sub-layer (e.g. a target highest TemporalId), and a target layer identifier list as inputs, and that is associated with a set of output layers. Alternatively, another term, such as an output operation point, may be used when referring to an operation point and the associated set of output layers. For example, in MV-HEVC/SHVC, an output operation point may be defined as a bitstream that is created from an input bitstream by operation of the sub-bitstream extraction process with the input bitstream, a target highest TemporalId, and a target layer identifier list as inputs, and that is associated with a set of output layers.

An output layer set may be defined as a set of layers consisting of the layers of one of the specified layer sets, where one or more layers in the set of layers are indicated to be output layers. An output layer may be defined as a layer of an output layer set that is output when the decoder and/or the HRD operates using the output layer set as the target output layer set. In MV-HEVC/SHVC, the variable TargetOlsIdx may specify which output layer set is the target output layer set by setting TargetOlsIdx equal to the index of the output layer set that is the target output layer set. TargetOlsIdx may be set for example by the HRD and/or may be set by external means, for example by a player or alike through an interface provided by the decoder. In MV-HEVC/SHVC, an output layer may be defined as a layer of an output layer set that is output when TargetOlsIdx is equal to the index of the output layer set.

MV-HEVC/SHVC enable derivation of a "default" output layer set for each layer set specified in the VPS using a specific mechanism or by indicating the output layers explicitly. Two specific mechanisms have been specified: it may be specified in the VPS that each layer is an output layer or that only the highest layer is an output layer in a "default" output layer set. Auxiliary picture layers may be excluded from consideration when determining whether a layer is an output layer using the mentioned specific mechanisms. In addition, to the "default" output layer sets, the VPS extension enables to specify additional output layer sets with selected layers indicated to be output layers.

Figure 5:
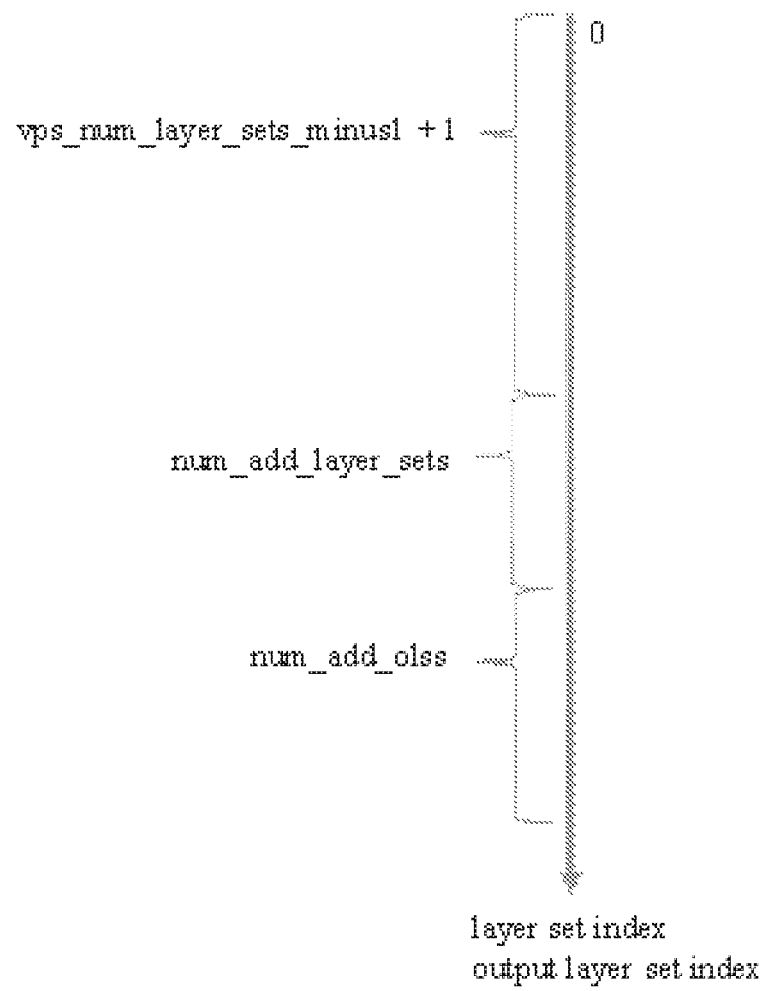
FIG. 5 shows an example for indicating indices for different types of layer sets.

A particular layer set, additional layer set, or output layer set can be referred to through an index, and indices may be assigned according to the order layer sets, additional layer sets, and output layer sets are indicated in the VPS. Output layer sets may use the same index space as layer sets and additional layers so that the "default" output layer sets for each layer set and additional layer set have the index of the respective layer set or additional layer, and additional output layer sets use index values beyond those used by layer sets or additional layer sets. This is illustrated in FIG. 5, where vps_num_layer_sets_minus1+1 indicates the number of layer sets indicated in the base VPS, num_add_layer_sets indicates the number of additional layer sets, and num_add_olss indicates the number of additional output layer sets.

A sender, a gateway, or alike may select the transmitted layers and/or sub-layers of a scalable video bitstream. Terms layer extraction, extraction of layers, or layer down-switching may refer to transmitting fewer layers than what is available in the bitstream received by the sender, gateway, or alike. Layer up-switching may refer to transmitting additional layer(s) compared to those transmitted prior to the layer up-switching by the sender, gateway, or alike, i.e. restarting the transmission of one or more layers whose transmission was ceased earlier in layer down-switching. Similarly to layer down-switching and/or up-switching, the sender, gateway or alike may perform down- and/or up-switching of temporal sub-layers. The sender, gateway or alike may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

A sub-bitstream extraction process specified in a video coding standard may be used for layer extraction. However, sub-bitstream extraction processes specified in video coding standards typically operate with units that have a relatively long duration, such as an entire bitstream or an entire CVSG. In other words, sub-bitstream extraction processes may take as input e.g. an entire bitstream or an entire CVSG and produce as output e.g. an entire bitstream or an entire CVSG, respectively, from which the specified layers have been excluded. A sub-bitstream extraction process may therefore be sub-optimal e.g. for short-duration bitrate adaptation needs.

In addition to or instead of a sub-bitstream extraction process specified in a video coding standard, other methods may be used for layer extraction. For example, when a multi-loop decoding process is used for a scalable video bitstream, layer down-switching can take place at any access unit. In HEVC, the sender, gateway, or alike may insert, in the transmitted stream, an EOS NAL unit with nuh_layer_id LayerId equal to the nuh_layer_id value of the layer the transmission of which was discontinued in the down-switching. This EOS NAL unit specifies that the next IRAP picture with nuh_layer_id equal to LayerId, included in the transmitted stream as a result of layer up-switching, re-initiates the decoding process of that layer.

In addition to or instead of enabling layer up-switching at positions enabled by a sub-bitstream extraction process specified in a video coding standard, such as at the start of a bitstream or at the start of a CVSG, other methods may be used for layer up-switching. For example, layer up-switching can take place at an IRAP picture at the switch-to layer provided that all the reference layers of the IRAP picture are decodable at the point of the IRAP picture. The sender, gateway or alike may therefore need to i) find IRAP pictures at the switch-to layer, and ii) keep track which reference layers are correctly decodable (e.g. similarly to maintaining the LayerInitializedFlag[layerId] variable of the MV-HEVC/SHVC decoding process). If layer up-switching is about to take place at a CRA picture, the sender, gateway or alike may rewrite the CRA NAL unit type to BLA NAL unit type or use some external means to convey the information of the up-switching at the CRA picture to the decoder. If EOS NAL unit, as specified by HEVC, had not been included as response to layer down-switching (see above), layer up-switching may require the sender, gateway. or alike to either rewrite the CRA NAL unit type to BLA NAL unit type or use some external means to convey the information of the up-switching at the CRA picture to the decoder. The RASL pictures associated with the IRAP picture of the up-switch point might not be decodable correctly. The sender, gateway or alike can reduce the bitrate of the forwarded stream by omitting the RASL pictures associated with the IRAP picture of the up-switch point from the forwarded stream. Additionally, the sender, gateway or alike can reduce the bitrate of the forwarded stream by omitting the RADL pictures associated with the IRAP picture of the up-switch point from the forwarded stream. The steps above may need to be performed for each potential switch-to layer separately.

Figure 6:
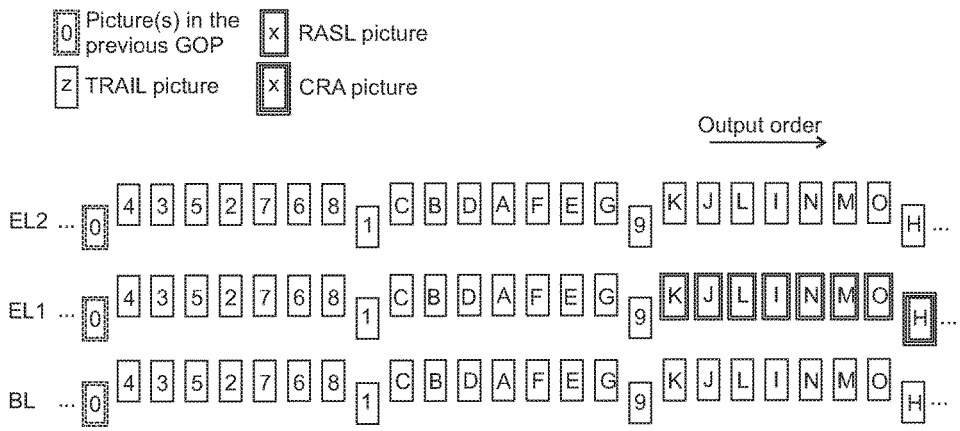
FIG. 6 shows an example of 3-layer bitstream.

Examples of layer up-switching are presented with the example bitstream illustrated in FIG. 6. It is assumed that each picture uses inter-layer prediction from the lower layer (EL1 predicts from BL, and EL2 predicts from EL1). It is further assumed that hierarchical inter prediction is in use with GOP size of 8. This bitstream is the output of the encoder and the input of the middle-box prior to any layer down- or up-switching operations.

Figure 7:
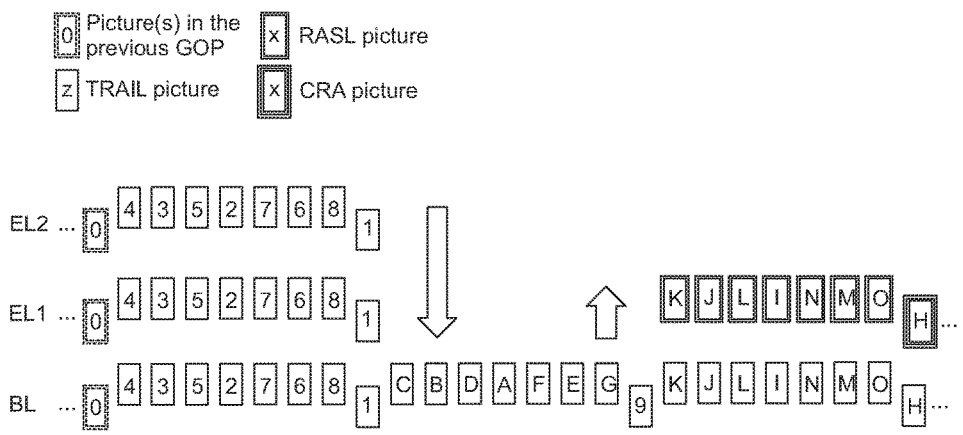
FIG. 7 shows an example of forwarded bitstream of FIG. 6 resulting in a proper layer up-switching.

In FIG. 7, the middle-box determines to switch down from forwarding three layers to forwarding only one layer at picture 9. Subsequently, the sender, gateway or alike determines to switch-up layers at access unit H. As only EL1 contains an IRAP picture at that point, the middle-box starts to forward EL1 but not EL2. The sender, gateway or alike can convert the CRA NAL unit type of picture H at EL1 to a BLA NAL unit type, or pass information to the decoder that HandleCraAsBlaFlag shall be set to 1 for the CRA picture (the latter option is illustrated in the figure). The sender, gateway or alike can but needs not omit the forwarding of the associated RASL pictures (pictures I to O of EL1 in the figure). The latter one of these options is illustrated in FIG. 7.

As discussed above, in HEVC multi-layer extensions an EOS NAL unit with nuh_layer_id greater than 0 can be regarded as an indication of a discontinuity of a layer. Additionally or alternatively, other means for indicating a discontinuity of a layer may exist. For example a new type of NAL unit may be used for indicating a discontinuity of a layer. The NAL unit may be referred to as a discontinuity-of-layer (DOL) NAL unit. The DOL NAL unit may be defined to be a non-VCL NAL unit. The payload of the DOL NAL unit may be empty or may contain syntax elements, which may e.g. further characterize the discontinuity. The payload of the DOL NAL unit may additionally include an extension mechanism, e.g. a bit indicating if additional reserved syntax elements follow.

In response to a decoded indication of a discontinuity of a first layer, all decoded pictures of the first layer and the predicted layers of the first layer within a decoded picture buffer may be marked as unused for reference. Additionally or alternatively, in response to a decoded indication of a discontinuity of a first layer, it may be determined that a layer-wise start-up mechanism may be used in decoding pictures of the first layer and the predicted layers. This may be achieved by setting the variables LayerinitializedFlag and FirstPicInLayerDecodedFlag equal to 0 for the first layer and all its predicted layers.

An indication of a discontinuity of a layer may also or alternatively be an SEI message, such as the layers not present SEI message of HEVC. As SEI messages have no normative decoding process in video coding standards, it may not be possible to perform normative decoding operations, such as decoded reference picture marking or initialization of layer-wise start-up mechanism, in response to an SEI message. The layers not present SEI message of HEVC comprises a set of 1-bit syntax elements layer_not_present_flag[i], each associated with a layer. layer_not_present_flag [i] equal to 1 indicates that there are no VCL NAL units with nuh_layer_id equal to layer_id_in_nuh[i] present in the target access units. layer_not_present_flag[i] equal to 0 indicates that there may or may not be VCL NAL units with nuh_layer_id equal to layer_id_in_nuh[i] present in the target access units. The target access units are defined as the set of access units starting from the access unit containing the layers not present SEI message up to but not including the next access unit, in decoding order, that contains a layers not present change SEI message or the end of the CVS, whichever is earlier in decoding order. It is required in HEVC that a layers not present SEI message shall not be included in an SEI NAL unit with TemporalId greater than 0. The layers not present SEI message may have the following syntax:

|  | Descriptor |
|---|---|
| layers_not_present( payloadSize ) { | |
|    lnp_sei_active_vps_id | u(4) |
|    for( i = 0; i <= MaxLayersMinus1; i++ ) | |
|       layer_not_present_flag[ i ] | u(1) |
| } | |

While a constant set of output layers suits well use cases and bitstreams where the highest layer stays unchanged in each access unit, they may not support use cases where the highest layer changes from one access unit to another. It has therefore been proposed that encoders can specify the use of alternative output layers within the bitstream and in response to the specified use of alternative output layers decoders output a decoded picture from an alternative output layer in the absence of a picture in an output layer within the same access unit. Several possibilities exist how to indicate alternative output layers. For example, each output layer in an output layer set may be associated with a minimum alternative output layer, and output-layer-wise syntax element(s) may be used for specifying alternative output layer(s) for each output layer. Alternatively, the alternative output layer set mechanism may be constrained to be used only for output layer sets containing only one output layer, and output-layer-set-wise syntax element(s) may be used for specifying alternative output layer(s) for the output layer of the output layer set. Alternatively, as specified in HEVC, the alternative output layer set mechanism may be constrained to be used only for output layer sets containing only one output layer, and an output-layer-set-wise flag (alt_output_layer_flag[olsIdx] in HEVC) may be used for specifying that any direct or indirect reference layer of the output layer may serve as an alternative output layer for the output layer of the output layer set. Alternatively, the alternative output layer set mechanism may be constrained to be used only for bitstreams or CVSs in which all specified output layer sets contain only one output layer, and the alternative output layer(s) may be indicated by bitstream- or CVS-wise syntax element(s). The alternative output layer(s) may be for example specified by listing e.g. within VPS the alternative output layers (e.g. using their layer identifiers or indexes of the list of direct or indirect reference layers), indicating a minimum alternative output layer (e.g. using its layer identifier or its index within the list of direct or indirect reference layers), or a flag specifying that any direct or indirect reference layer is an alternative output layer. When more than one alternative output layer is enabled to be used, it may be specified that the first direct or indirect inter-layer reference picture present in the access unit in descending layer identifier order down to the indicated minimum alternative output layer is output.

Picture output in scalable coding may be controlled for example as follows: For each picture PicOutputFlag is first derived in the decoding process similarly as for a single-layer bitstream. For example, pic_output_flag included in the bitstream for the picture may be taken into account in the derivation of PicOutputFlag. When an access unit has been decoded, the output layers and possible alternative output layers are used to update PicOutputFlag for each picture of the access unit.

When a bitstream specifies the use of an alternative output layer mechanism, the decoding process may operate as follows when it comes to controlling decoded picture output from the decoding process. Here, it is assumed that HEVC decoding is in use and alt_output_layer_flag[TargetOlsIdx] is equal to 1, but the decoding process could be realized similarly with other codecs. When the decoding of a picture is completed, the variable PicOutputFlag for the picture may be set as follows:

If LayerInitializedFlag[nuh_layer_id] is equal to 0, PicOutputFlag is set equal to 0.

Otherwise, if the current picture is a RASL picture and NoRaslOutputFlag of the associated IRAP picture is equal to 1, PicOutputFlag is set equal to 0.

Otherwise, PicOutputFlag is set equal to pic_output_flag, where pic_output_flag is a syntax element associated with the picture, e.g. carried in the slice header of the coded slices of the picture.

Additionally, when the decoding of the last picture of an access unit is completed, PicOutputFlag of each decoded picture of the access unit may be updated as follows (prior to the decoding of the next picture):

If alt_output_layer_flag[TargetOlsIdx] is equal to 1 and the current access unit either does not contain a picture at the output layer or contains a picture at the output layer that has PicOutputFlag equal to 0, the following ordered steps apply:

The list nonOutputLayerPictures is set to be the list of the pictures of the access unit with PicOutputFlag equal to 1 and with nuh_layer_id values among the nuh_layer_id values of the reference layers of the output layer.

When the list nonOutputLayerPictures is not empty, the picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in an output layer is set equal to 0.

As described in the previous paragraph, when the alternative output layer mechanism is in use, the decoding of an access unit may need to be completed before it can be determined which decoded picture(s) of the access unit are output by the decoding process.

A HRD for a scalable video bitstream may operate similarly to a HRD for a single-layer bitstream. However, some changes may be required or desirable, particularly when it comes to the DPB operation in multi-loop decoding of a scalable bitstream. It is possible to specify DPB operation for multi-loop decoding of a scalable bitstream in multiple ways. In a layer-wise approach, each layer may have conceptually its own DPB, which may otherwise operate independently but some DPB parameters may be provided jointly for all the layer-wise DPBs and picture output may operate synchronously so that the pictures having the same output time are output at the same time or, in output order conformance checking, pictures from the same access unit are output next to each other. In another approach, referred to as the resolution-specific approach, layers having the same key properties share the same sub-DPB. The key properties may include one or more of the following: picture width, picture height, chroma format, bitdepth, color format/gamut.

It may be possible to support both layer-wise and resolution-specific DPB approach with the same DPB model, which may be referred to as the sub-DPB model. The DPB is partitioned into several sub-DPBs, and each sub-DPB is otherwise managed independently but some DPB parameters may be provided jointly for all the sub-DPBs and picture output may operate synchronously so that the pictures having the same output time are output at the same time or, in output order conformance checking, pictures from the same access unit are output next to each other.

The DPB may be considered to be logically partitioned into sub-DPBs and each sub-DPB contains picture storage buffers. Each sub-DPB may be associated with a layer (in a layer-specific mode) or all layers of a particular combination of resolution, chroma format and bit depth (in a so-called resolution-specific mode), and all pictures in the layer(s) may be stored in the associated sub-DPB. The operation of sub-DPBs may be independent of each other—in terms of insertion, marking, and removal of decoded pictures as well as the size of each sub-DPB, though the output of decoded pictures from different sub-DPBs may be linked through their output times or picture order count values. In the resolution-specific mode, encoders may provide the number of picture buffers per sub-DPB and/or per layer, and decoders or the HRD may use either or both types of the number of picture buffer in their buffering operation. For example, in output order conforming decoding, a bumping process may be invoked when the number of stored pictures in a layer meets or exceeds a specified per-layer number of picture buffers and/or when the number of pictures stored in a sub-DPB meets or exceeds a specified number of picture buffers for that sub-DPB.

Some draft versions of MV-HEVC and SHVC included a feature sometimes referred to as early marking or early marking of pictures as "unused for reference" is described as follows. In early marking, a sub-layer non-reference picture is marked as "unused for reference" when its TemporalId is equal to the highest TemporalId that is being decoded (i.e., the highest TemporalId of the operation point in use) and when all pictures that may use the sub-layer non-reference picture as a reference for inter-layer prediction have been decoded. Consequently, a picture storage buffer may be emptied sooner than when the early marking is not applied, which may reduce the maximum required DPB occupancy particularly in a resolution-specific sub-DPB operation. The pictures that may use the sub-layer non-reference picture as a reference for inter-layer prediction may be concluded from layer dependency information, such as the direct_dependency_flag[i][j] syntax elements of HEVC. In some cases, layer dependencies may be indicated separately for each temporal sub-layer and/or picture type, or a pair of layers above certain TemporalId values and/or with certain picture type may be indicated to have no dependencies, while they may dependent on each other at or below certain TemporalId values and/or with other picture types. For example, the max_tid_il_ref pics_plus1[i][j] of HEVC may be used. The pictures that may use the sub-layer non-reference picture as a reference for inter-layer prediction may be concluded from layer dependency information applying for certain temporal sub-layers and/or picture types. However, there is a problem that it might not be known which are the highest nuh_layer_id value that is present in the bitstream and/or in a particular access unit to which the early marking is to be applied. Consequently, a first picture may remain marked as "used for reference" if it was expected or possible (e.g. based on sequence-level information, such as VPS) that access unit would have contained subsequent pictures (in decoding order) that may have used the first picture as reference for inter-layer prediction.

In the context of multiview video coding, view order index may be defined as an index that indicates the decoding or bitstream order of view components in an access unit.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. In some cases, chroma components or sample arrays may also be present, although decoded chroma sample arrays may be required to have a certain sample value and decoding of the chroma sample arrays may be ignored. A depth map is an image with per-pixel depth information, disparity of respectively pixels in two views, or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis.

Depth-enhanced video refers to texture video having one or more views associated with depth video having one or more depth views. A number of approaches may be used for representing of depth-enhanced video, including the use of video plus depth (V+D), and multiview video plus depth (MVD). In the video plus depth (V+D) representation, a single view of texture and the respective view of depth are represented as sequences of texture picture and depth pictures, respectively. The MVD representation contains a number of texture views and respective depth views. The depth information may be used in so-called depth-image-based rendering to synthesize texture views at viewpoints not represented by any of the coded texture views.

A texture view component may be defined as a coded representation of the texture of a view in a single access unit. A depth view component may be defined as a coded representation of the depth of a view in a single access unit.

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

SVC as allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref base_pic_flag" is equal to 1).

The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by having the quality_id syntax element greater than 0.

The scalability structure in SVC may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref base_pic_flag" is set equal to 1. An enhancement representation, also referred to as a decoded picture, results from the regular decoding process in which all the layer representations that are present for the highest dependency representation are decoded.

A feature of the SVC standard is that MGS NAL units can be freely dropped (but cannot be truncated) without affecting the conformance of the bitstream. As discussed above, when those MGS data have been used for inter prediction reference during encoding, dropping the data would result in a mismatch between the decoded pictures in the decoder side and in the encoder side. This mismatch is also referred to as drift. To control drift due to the dropping MGS data, the encoder and the decoder can selectively use the decoded base picture, rather than the decoded picture, as a reference for prediction.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

In MV-HEVC, SHVC and/or alike, VPS may for example include a mapping of the LayerId value derived from the NAL unit header to one or more scalability dimension values, for example correspond to dependency_id, quality_id, view_id, and depth_flag for the layer defined similarly to SVC and MVC.

In MV-HEVC/SHVC, it may be indicated in the VPS that a layer with layer identifier value greater than 0 has no direct reference layers, i.e. that the layer is not inter-layer predicted from any other layer. In other words, an MV-HEVC/SHVC bitstream may contain layers that are independent of each other, which may be referred to as simulcast layers or independent layers.

A part of the VPS extension, which specifies the scalability dimensions that may be present in the bitstream, the mapping of nuh_layer_id values to scalability dimension values, and the dependencies between layers may be specified with the following syntax:

|  | Descriptor |
|---|---|
| vps_extension( ) { |  |
|   splitting_flag | u(1) |
|   for( i = 0, NumScalabilityTypes = 0; i < 16; i++ ) { |  |
|     scalability_mask_flag[ i ] | u(1) |
|     NumScalabilityTypes += scalability_mask_flag[ i ] |  |
|   } |  |

-continued

|  | Descriptor |
|---|---|
|   for( j = 0; j < ( NumScalabilityTypes − splitting_flag ); j++ ) |  |
|     dimension_id_len_minus1[ j ] | u(3) |
|   vps_nuh_layer_id_present_flag | u(1) |
|   for( i = 1; i <= MaxLayersMinus1; i++ ) { |  |
|     if( vps_nuh_layer_id_present_flag ) |  |
|       layer_id_in_nuh[ i ] | u(6) |
|     if( !splitting_flag ) |  |
|       for( j = 0; j < NumScalabilityTypes; j++ ) |  |
|         dimension_id[ i ][ j ] | u(v) |
|   } |  |
|   view_id_len | u(4) |
|   if( view_id_len > 0 ) |  |
|     for( i = 0; i < NumViews; i++ ) |  |
|       view_id_val[ i ] | u(v) |
|   for( i = 1; i <= MaxLayersMinus1; i++ ) |  |
|     for( j = 0; j < i; j++ ) |  |
|       direct_dependency_flag[ i ][ j ] | u(1) |
| ... |  |

The semantics of the above-shown part of the VPS may be specified as described in the following paragraphs.

splitting_flag equal to 1 indicates that the dimension_id[i][j] syntax elements are not present and that the binary representation of the nuh_layer_id value in the NAL unit header are split into NumScalabilityTypes segments with lengths, in bits, according to the values of dimension_id_len_minus1[j] and that the values of dimension_id[LayerIdxInVps[nuh_layer_id]][j] are inferred from the NumScalabilityTypes segments. splitting_flag equal to 0 indicates that the syntax elements dimension_id[i][j] are present. In the following example semantics, without loss of generality, it is assumed that splitting_flag is equal to 0.

scalability_mask_flag[i] equal to 1 indicates that dimension_id syntax elements corresponding to the i-th scalability dimension in the following table are present. scalability_mask_flag[i] equal to 0 indicates that dimension_id syntax elements corresponding to the i-th scalability dimension are not present.

| scalability mask index | Scalability dimension | ScalabilityId mapping |
|---|---|---|
| 0 | Reserved |  |
| 1 | Multiview | View Order Index |
| 2 | Spatial/qualityscalability | DependencyId |
| 3 | Auxiliary | AuxId |
| 4-15 | Reserved |  |

In future 3D extensions of HEVC, scalability mask index 0 may be used to indicate depth maps.

dimension_id_len_minus1[j] plus 1 specifies the length, in bits, of the dimension_id[i][j] syntax element.

vps_nuh_layer_id_present_flag equal to 1 specifies that layer_id_in_nuh[i] for i from 0 to MaxLayersMinus1 (which is equal to the maximum number of layers specified in the VPS minus 1), inclusive, are present. vps_nuh_layer_id_present_flag equal to 0 specifies that layer_id_in_nuh[i] for i from 0 to MaxLayersMinus1, inclusive, are not present.

layer_id_in_nuh[i] specifies the value of the nuh_layer_id syntax element in VCL NAL units of the i-th layer. For i in the range of 0 to MaxLayersMinus1, inclusive, when layer_id_in_nuh[i] is not present, the value is inferred to be equal to i. When i is greater than 0, layer_id_in_nuh[i] is greater than layer_id_in_nuh[i−1]. For i from 0 to MaxLayersMinus1, inclusive, the variable LayerIdxInVps[layer_id_in_nuh[i]] is set equal to i.

dimension_id[i][j] specifies the identifier of the j-th present scalability dimension type of the i-th layer. The number of bits used for the representation of dimension_id[i][ j] is dimension_id_len_minus1[j]+1 bits. When splitting_flag is equal to 0, for j from 0 to NumScalabilityTypes−1, inclusive, dimension_id[0][j] is inferred to be equal to 0

The variable ScalabilityId[i][smIdx] specifying the identifier of the smIdx-th scalability dimension type of the i-th layer, the variable ViewOrderIdx[layer_id_in_nuh[i]] specifying the view order index of the i-th layer, DependencyId [layer_id_in_nuh[i]] specifying the spatial/quality scalability identifier of the i-th layer, and the variable ViewScalExtLayerFlag[layer_id_in_nuh[i]] specifying whether the i-th layer is a view scalability extension layer are derived as follows:

```
NumViews = 1
for( i = 0; i <= MaxLayersMinus1; i++ ) {
    lId = layer_id_in_nuh[ i ]
    for( smIdx= 0, j = 0; smIdx < 16; smIdx++ )
        if( scalability_mask_flag[ smIdx ] )
            ScalabilityId[ i ][ smIdx ] = dimension_id[ i ][ j++ ]
    ViewOrderIdx[ lId ] = ScalabilityId[ i ][ 1 ]
    DependencyId[ lId ] = ScalabilityId[ i ][ 2 ]
    if( i > 0 && ( ViewOrderIdx[ lId ] != ScalabilityId[ i − 1 ][ 1 ] ) )
        NumViews++
    ViewScalExtLayerFlag[ lId ] = ( ViewOrderIdx[ lId ] > 0 )
    AuxId[ lId ] = ScalabilityId[ i ][ 3 ]
}
```

Enhancement layers or layers with a layer identifier value greater than 0 may be indicated to contain auxiliary video complementing the base layer or other layers. For example, in the present draft of MV-HEVC, auxiliary pictures may be encoded in a bitstream using auxiliary picture layers. An auxiliary picture layer is associated with its own scalability dimension value, AuxId (similarly to e.g. view order index). Layers with AuxId greater than 0 contain auxiliary pictures. A layer carries only one type of auxiliary pictures, and the type of auxiliary pictures included in a layer may be indicated by its AuxId value. In other words, AuxId values may be mapped to types of auxiliary pictures. For example, AuxId equal to 1 may indicate alpha planes and AuxId equal to 2 may indicate depth pictures. An auxiliary picture may be defined as a picture that has no normative effect on the decoding process of primary pictures. In other words, primary pictures (with AuxId equal to 0) may be constrained not to predict from auxiliary pictures. An auxiliary picture may predict from a primary picture, although there may be constraints disallowing such prediction, for example based on the AuxId value. SEI messages may be used to convey more detailed characteristics of auxiliary picture layers, such as the depth range represented by a depth auxiliary layer.

Different types of auxiliary pictures may be used including but not limited to the following: Depth pictures; Alpha pictures. In Depth pictures a sample value represents disparity between the viewpoint (or camera position) of the depth picture or depth or distance. In Alpha pictures (a.k.a. alpha planes and alpha matte pictures) a sample value represents transparency or opacity. Alpha pictures may indicate for each pixel a degree of transparency or equivalently a degree of opacity. Depth and Alpha pictures may be monochrome pictures or the chroma components of alpha pictures may be set to indicate no chromaticity (e.g. 0 when chroma samples values are considered to be signed or 128 when chroma samples values are 8-bit and considered to be unsigned).

Continuing how the semantics of the presented VPS excerpt may be specified: view_id_len specifies the length, in bits, of the view_id_val[i] syntax element. view_id_val[i] specifies the view identifier of the i-th view specified by the VPS. The length of the view_id_val[i] syntax element is view_id_len bits. When not present, the value of view_id_val[i] is inferred to be equal to 0. For each layer with nuh_layer_id equal to nuhLayerId, the value ViewId [nuhLayerId] is set equal to view_id_vall ViewOrderIdx [nuhLayerId]1. direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to MaxLayersMinus1, it is inferred to be equal to 0.

The variable NumDirectRefLayers[iNuhLId] may be defined as the number of direct reference layers for the layer with nuh_layer_id equal to iNuhLId based on the layer dependency information. The variable NumRefLayers[iNuhLId] may be defined as the number of direct and indirect reference layers for the layer with nuh_layer_id equal to iNuhLId based on the layer dependency information. The variable RefLayerId[iNuhLId][j] (a.k.a. IdDirectRefLayer [iNuhLId][j]) may be defined as the list of nuh_layer_id values of the direct reference layers of the layer with nuh_layer_id equal to iNuhLId, where j is in the range of 0 to NumDirectRefLayers[iNuhLId]−1, inclusive, and each item j in the list corresponds to one direct reference layer. The variable IdRefLayer[iNuhLId][j]) may be defined as the list of nuh_layer_id values of the direct and indirect reference layers of the layer with nuh_layer_id equal to iNuhLId, where j is in the range of 0 to NumRefLayers[iNuhLId]−1, inclusive, and each item j in the list corresponds to one direct or indirect reference layer. The variables NumDirectRefLayers[iNuhLId] and RefLayerId[iNuhLId][j] may be specified as follows, where MaxLayersMinus1 is equal to the maximum number of layers specified in the VPS minus 1:

```
for( i = 0; i <= MaxLayersMinus1; i++ ) {
    iNuhLId = layer_id_in_nuh[ i ]
    NumDirectRefLayers[ iNuhLId ] = 0
    for( j = 0; j < i; j++ )
        if( direct_dependency_flag[ i ][ j ] )
            RefLayerId[ iNuhLId ][ NumDirectRefLayers[ iNuhLId ]++ ] = layer_id_in_nuh[ j ]
}
```

In SHVC, MV-HEVC, and/or alike, the block level syntax and decoding process are not changed for supporting inter-layer texture prediction. Only the high-level syntax, generally referring to the syntax structures including slice header, PPS, SPS, and VPS, has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in SHVC, MV-HEVC, and/or alike may be initialized using a specific process in which the inter-layer reference picture(s), if any, may be included in the initial reference picture list(s).

In the coding and/or decoding process, the inter-layer reference pictures may be treated as long term reference pictures.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. Examples are provided in the following:

- ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1'), while the enhancement layer(s) can be stored as another track which is linked to the base-layer track using so-called track references.
- Real-time Transport Protocol (RTP): an RTP stream can be used to convey one ore more layers, and hence RTP streams of the same RTP session can logically separate different layers.
- MPEG-2 transport stream (TS): Each layer can have a different packet identifier (PID) value.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

The bitstream format of H.264/AVC or H.265/HEVC does not include an indication of an end of an access unit. Consequently, the end of an access unit may have to be concluded based on the detection of the start of the next access unit. In low-latency applications, data from which the start of the next access unit can be concluded may be received significantly later, e.g. after one picture delay.

In the multi-layer H.265/HEVC extensions, such as SHVC and MV-HEVC, it is not required to include a picture unit in each layer consistently in each access unit. In other words, there may be a picture unit at layer A in one access unit but in another access unit no picture unit at layer A may be present. It is therefore not possible to conclude from the layer identifier values of a picture unit whether it is the last picture unit of an access unit.

A multi-layer bitstream may be subject to layer extraction in the sender and/or in one or more gateways or alike. An indication of an end of an access unit should be resilient to layer extractions so that decoders can conclude an end of access unit reliably even if the bitstream has been subject to layer extraction. Particularly, if the highest layer(s) of the bitstream are extracted out from the bitstream, decoders should still have means to conclude an end of an access unit. This implies that an indication at the highest layer, e.g. as a specific NAL unit or in an SEI message, is not a sufficient solution for the problem, as that indication would be extracted out from the bitstream together with other data on that layer.

Layer extraction may additionally or alternatively take place as a part of receiving a bitstream. For example, a receiver or a player or alike may determine that decoding and playback of a subset of the layers is desirable e.g. due to insufficient decoding capabilities to decode all layers in real-time. Layers may be sent through separate logical channels. For example, layers may be carried as different packetized elementary streams in an MPEG-2 transport stream. A receiver may receive and/or make use of a subset of layers only, e.g. received in a corresponding set of logical channels. A receiver should be able to conclude the end of an access unit from the data it has received and/or is making use of.

It is desirable that the NAL unit order is such that picture units appear in increasing order of layer identifier value within an access unit. This enables sending picture units of different layers in different logical channels, while the re-aggregation of an access unit can simply be done by concatenating picture units in increasing layer identifier order. In other words, it is desirable to avoid NAL unit level processing in re-aggregating an access unit. Furthermore, it is not desirable to rely on sending an end of access unit indication as part of the highest layer and/or the highest logical channel, because the highest layer and/or the highest logical channel might not be received or made use of by the receiver.

Some RTP payload formats, such as the RTP payload format for SVC specified in IETF RFC 6190, specify the marker bit (also referred to as the M bit) of the RTP header to indicate the end of an access unit. However, such an indication is not tolerant against extraction of layers.

Now in order to at least alleviate the above problems, methods for encoding and decoding an indication of an end of an access unit are presented hereinafter.

Figure 8:
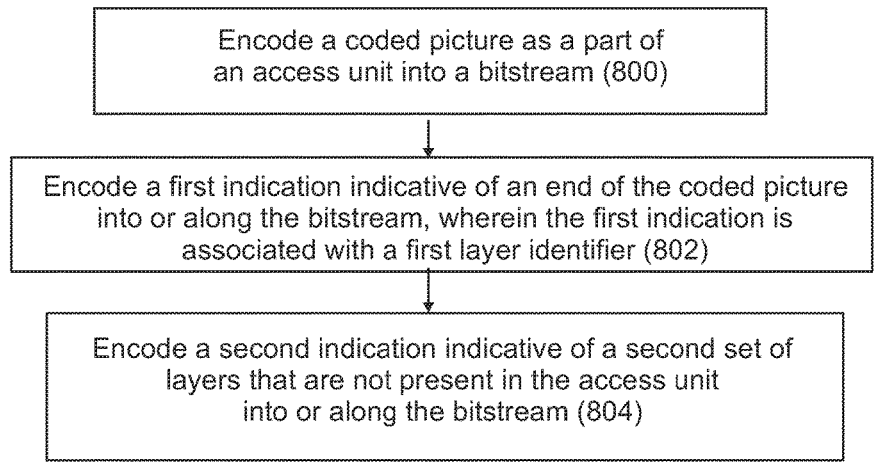
FIG. 8 shows a flow chart of an encoding method according to an embodiment of the invention.

In the encoding method, which is disclosed in FIG. 8, the encoder encodes (800) a coded picture as a part of an access unit into a bitstream. A first indication indicative of an end of the coded picture is encoded (802) into or along the bitstream, wherein the first indication is associated with a first layer identifier. Then, a second indication indicative of a second set of layers that are not present in the access unit is encoded (804) into or along the bitstream.

In an embodiment, the encoder encodes a coded picture as a part of an access unit into a bitstream. The encoder or another entity, such as packetize or transmitter, encodes a first indication indicative of an end of the coded picture into or along the bitstream, wherein the first indication is associated with a first layer identifier. Then, the encoder or another entity, such as a packetizer or transmitter, encodes a second indication indicative of a second set of layers that are not present in the access unit into or along the bitstream.

According to an embodiment, the first indication and the second indication are included in the same syntax structure. According to another embodiment, the first indication and the second indication are included in different syntax structures. According to an embodiment, the second indication is included both in a syntax structure different from that containing the first indication and also in the same syntax structure that also contains the first indication.

According to an embodiment, the first indication may be encoded into and/or decoded from one or more of the following syntax structures:

- A slice segment header or alike. For example, one of the reserved flags slice_reserved_flag[i] of HEVC may be used. In another example, one of the reserved bits within slice_segment_header_extension_data_byte[i] may be used.
- A slice segment trailer or alike. The syntax of a VCL NAL unit or a slice segment NAL unit may be specified in a manner that a trailer following the slice segment data may be present. A slice segment trailer may comprise the first indication.
- An SEI message, which may be included in a suffix SEI NAL unit.

According to an embodiment, the first indication may be encoded as a specific NAL unit or an SEI message in a suffix SEI NAL unit. Herein, for example a syntax structure disclosed in JCTVC-S0148, "Indication of the end of coded data for pictures and partial-picture regions" by Wu, Zhu, Sadhwani, and Sullivan 1, 7 Oct. 2014, may be used where solutions for early indication of the end of a coded picture or, more generally, an indication of the next CTU (for H.265/HEVC) or macroblock (for H.264/AVC) position are disclosed. JCTVC-S0148 enables detection of the end of a picture, but not the end of the access unit. JCTVC-S0148 proposes a coded region completion SEI message with the following syntax:

|  | Descriptor |
|---|---|
| coded_region_completion( payloadSize ) { | |
|    next_segment_address | ue(v) |
| } | |

The semantics of next_segment_address may be specified as follows: next_segment_address identifies the value of the slice_segment_address in the next slice header in the bitstream (when present). It may be required that when the next slice header has first_slice_in_pic_flag equal to 1 or no subsequent slice header is present in the bitstream, the value of next_segment_address shall be equal to 0.

In an embodiment, which may be applied together with or independently of other embodiments, the first indication is associated with information indicative of the sample arrays of represented by the coded picture and/or the sample arrays of represented by the next coded picture, in decoding order. For example, a sample array indication indicating one of luma, Cb, or Cr sample array, or all Y, Cb, and Cr sample arrays may be included in the same syntax structure that also carries the first indication. For example, when separate color planes are in use, the sample array indication may indicate luma, Cb, or Cr sample array, and when separate color planes are not in use, the sample array indication may indicate the combination of Y, Cb, and Cr sample arrays. In an embodiment, the end of a coded picture is determined based on the first indication and the sample array indication is used to determine that the coded picture is the last coded picture of the respective decoded picture (e.g., representing the Cr sample array when separate color planes are in use), and as response to both said determinations the coded pictures are provided to the decoding process and decoded. In an embodiment, any other embodiment is used to determine the end of a coded picture and that the access unit contains no pictures at layers higher than the layer of the current picture, and the sample array indication is used to determine that the coded picture is the last coded picture of the respective decoded picture, and as response to both said determinations the access unit is provided to the decoding process and decoded.

According to an embodiment, the second indication may be encoded into and/or decoded from one or more of the following syntax structures:

- A specific NAL unit, e.g. referred to as an end of picture unit NAL unit or an end-of-picture NAL unit, which is allowed to be the last NAL unit of a picture unit. It may be required that an end-of-picture NAL unit is not followed by any other NAL unit in the same picture unit except end-of-sequence or end-of-bitstream NAL units, when present.
- An SEI message, which may be included in a suffix SEI NAL unit.
- A VCL NAL unit syntax structure, for example within slice segment header extension data bytes.
- An access unit delimiter NAL unit or alike.
- A picture header syntax structure or alike.
- A slice header syntax structure or alike.

According to an embodiment, one or more layer patterns are encoded into a sequence-level syntax structure and/or group of pictures level syntax structure in or along the bitstream. The one or more layer patterns may be indexed in their appearance order in the syntax structure or an identifier may be assigned to each of the one or more layer pattern. A layer pattern may indicate a set of layer identifier values, such as nuh_layer_id values. The set of layer identifier values may indicate the layers that may be present in an access unit that is associated with the layer pattern. Alternatively or additionally, the set of layer identifier values may indicate absent layers in an access unit that is associated with the layer pattern. Additionally, an index or identifier of the layer pattern applying to (or associated with) the access unit is encoded into or along the bitstream in a manner that it is associated with the access unit, e.g. by including the index or identifier of the layer pattern in a syntax structure that is contained in the access unit. The second indication may be considered to comprise both the coded one or more layer patterns and the index or identifier, or it may be considered to comprise only the index or identifier.

According to an embodiment, the encoder encodes into or along the bitstream a third indication indicative of whether a picture that is or may be present in an access unit is an IRAP picture or alike (enabling layer up-switching). The third indication may be included in the same syntax structure as the second indication and/or may be present separately from the second indication.

The embodiments described in this paragraph may be applied together with or independently of embodiments described elsewhere. According to an embodiment, the first indication and/or the second indication may be required, for example by a coding standard, to be consistently present for each access unit. According to an embodiment, the first indication and/or the second indication may be required to be required to be consistently present for each access unit of a bitstream, when the first indication and/or the second indication is present for the first access unit of the bitstream. According to an embodiment, the first indication and/or the second indication may be required to be required to be consistently present for each access unit of a CVSG, when the first indication and/or the second indication is present for the first access unit of the CVSG. According to an embodiment, the first indication and/or the second indication may be required to be required to be consistently present for each access unit of a CVS, when the first indication and/or the second indication is present for the first access unit of the CVS. According to an embodiment, the first indication and/or the second indication may be required to be required to be consistently present for each access unit of a CVSG, when its or their consistent presence is indicated, through another indication applying to CVSG level, e.g. through a syntax element in VPS. In an embodiment, an encoder encodes another indication, in or along the bitstream, indicative whether the first indication and/or the second indication is present in each access unit of the CVSG. In an embodiment, a decoder decodes another indication, from or along the bitstream, indicative whether the first indication and/or the second indication is present in each access unit of the CVSG. According to an embodiment, the first indication and/or the second indication may be required to be required to be consistently present for each access unit of a CVS, when its or their consistent presence is indicated, through another indication applying to CVS level, e.g. through a syntax element in VPS or SPS. In an embodiment, an encoder encodes another indication, in or along the bitstream, indicative whether the first indication and/or the second indication is present in each access unit of the CVS. In an embodiment, a decoder decodes another indication, from or along the bitstream, indicative whether the first indication and/or the second indication is present in each access unit of the CVS.

According to an embodiment, the coded pictures and/or the layer identifiers may include one or more of the following properties:

The layer identifiers are non-negative integer values.
A coded picture is associated with a layer.
A layer is associated with a layer identifier value.
Coded pictures within an access unit are in increasing layer identifier order.
An access unit comprises coded pictures that are associated with the same output time.

Figure 9:
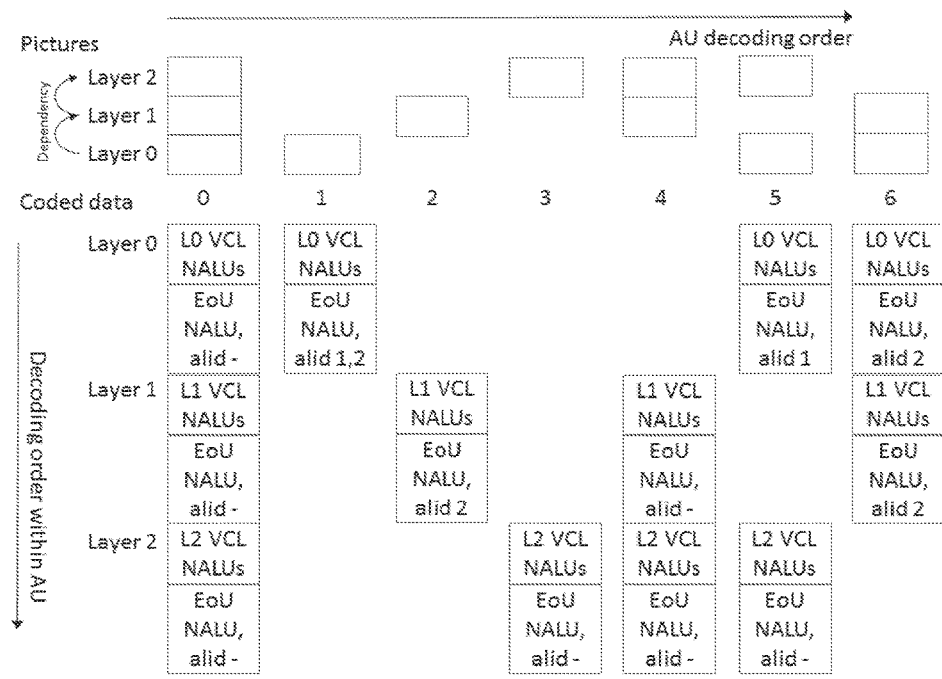
FIG. 9 shows an example bitstream encoded according to an embodiment of the invention.

FIG. 9 shows an example bitstream according to at least some of the embodiments. Three layers are encoded, where layer 1 depends on layer 0 and layer 2 depends on layer 1. Access units 0 to 6 are coded with pictures of different layers being present. A NAL unit, referred to as EoU NAL unit, includes the first indication and the second indication, and is included in the bitstream after each coded picture. The second indication comprises a list of layers that are not present in the access unit and whose layer identifier value is greater than that associated with the EoU NAL unit itself. Herein, the second indication is referred to as "alid"; i.e. absent layer identifiers values greater than the current layer identifier.

According to an embodiment, the second indication indicates layers that may be present in the access unit. Layers that are absent can be determined as those layers that are not listed as possibly being present (and have a layer identifier value greater than that associated with the second indication itself). As a consequence, the interpretation of the second indication does not depend on the information in the video parameter set, such as which layers may be present in the bitstream or layer dependency information.

For example, the following syntax may be used in an SEI message:

| | Descriptor |
|---|---|
| coded_unit_completion( payloadSize ) { | |
|   next_segment_address | ue(v) |
|   if( next_segment_address = = 0 ) { | |

-continued

| | Descriptor |
|---|---|
|     num_foll_pic_units_in_au | ue(v) |
|     for( i = 0; i < num_foll_pic_units_in_au; i++ ) | |
|       foll_layer_id[ i ] | u(6) |
|   } | |
| } | |

The semantics may be specified as follows:

next_segment_address identifies the value of the slice_segment_address in the next slice segment header in the bitstream (when present). When the next slice segment header starts a new coded picture, i.e. has first_slice_in_pic_flag equal to 1 in HEVC or no subsequent slice segment header is present in the bitstream, the value of next_segment_address shall be equal to 0.

num_foll_pic_units_in_au specifies the number of foll_layer_id[i] syntax elements present in the syntax structure.

foll_layer_id[i] indicates that VCL NAL units with a nuh_layer_id value equal to foll_layer_id[i] may be present in the access unit containing this SEI message. VCL NAL units with a nuh_layer_id value greater than the nuh_layer_id of the current SEI NAL unit and not equal to foll_layer_id[i] for any value of i in the range of 0 to num_foll_pic_units_in_au−1, inclusive, are not present in the access unit containing this SEI message.

According to an embodiment, the second indication indicates layers that may be present in the access unit. Layers that are absent can be determined as those layers that are not listed as possibly being present (and have a layer identifier value greater than that associated with the second indication itself). Additionally, some of the layers are indicated to be potentially present in the access using the second indication may be indicated to be absent by other means, such as a prior end of sequence NAL unit associated with a layer, layers not present SEI message, or some other layer discontinuity indication. As a consequence, the interpretation of the second indication does not depend on the information in the video parameter set, such as which layers may be present in the bitstream or layer dependency information.

In an embodiment, the encoder encodes a coded picture as a part of an access unit into a bitstream. The encoder or a second entity, such as packetize or transmitter, encodes a first indication indicative of an end of the coded picture into or along the bitstream, wherein the first indication is associated with a first layer identifier. Then, the encoder or the second entity, such as a packetizer or transmitter, encodes a second indication indicative of a second set of layers that are not present in the access unit into or along the bitstream. Moreover, the second entity or a third entity, such as a gateway, performs layer down-switching and accordingly encodes an indication of a discontinuity of a layer into or along the bitstream. The second indication may be understood to be indicative of the layers that are present in the bitstream prior to the layer down-switching.

In the following embodiments, the interpretation of the second indication may depend on the information in the video parameter set, such as which layers may be present in the bitstream or layer dependency information.

According to an embodiment, the second indication comprises the layers not present SEI message of HEVC or alike, and hence may be indicative of the layers that are not present in an access unit and layers that may be present in the access unit. The mapping of the syntax element layer_not_present_ flag[i] for each particular value of i to a layer identifier value (i.e. nuh_layer_id value in HEVC) requires accessing the active VPS.

According to an embodiment, the second indication comprises the layers not present SEI message of HEVC or alike, but the message is allowed be contained in an SEI NAL unit of any layer identifier (nuh_layer_id) value. It may be required that the when the layer_not_present_flag[i] concerns a layer having a layer identifier (nuh_layer_id) value smaller than that of the SEI NAL unit containing the SEI NAL unit, the layer_not_present_flag[i] shall not contradict with the picture units that have been present in the access unit prior to the SEI NAL unit.

According to an embodiment, the second indication is contained in syntax structure, such as a SEI NAL unit, that is associated with a first layer identifier value, e.g. through the nuh_layer_id value of the NAL unit containing the syntax structure. The second indication may exclude information concerning layers having a layer identifier value less than the first layer identifier value. Alternatively, the information, included in the second indication, concerning layers having a layer identifier value less than the first layer identifier value may be unspecified (in terms of semantics) and/or may be ignored by decoders.

According to an embodiment, the second indication indicates layers that are absent in the access unit. For example, the following syntax may be used:

| | Descriptor |
|---|---|
| coded_unit_completion( payloadSize ) { | |
|     next_segment_address | ue(v) |
|     if( next_segment_address = = 0 ) { | |
|         num_absent_pic_units | ue(v) |
|         for( i = 0; i < num_not_present_pic_units; i++ ) | |
|             absent_layer_id[ i ] | u(6) |
|     } | |
| } | |

The semantics of next_segment_address may be the same as above, while the remaining semantics may be specified as follows:

num_absent_pic_units specifies the number of absent_layer_id[i] syntax elements present in the syntax structure.

absent_layer_id[i] indicates that VCL NAL units with a nuh_layer_id value equal to absent_layer_id[i] are not present in the access unit containing this SEI message.

According to an embodiment, the second indication indicates layer sets for which the associated picture unit is the last picture unit in the access unit. For example, the following syntax may be used:

| | Descriptor |
|---|---|
| coded_unit_completion( payloadSize ) { | |
|     next_segment_address | ue(v) |
|     if( next_segment_address = = 0 ) { | |
|         num_layer_sets_au_ending | ue(v) |
|         for( i = 0; i < num_layer_sets_au_ending; i++ ) | |
|             ls_idx_au_ending[ i ] | ue(v) |
|     } | |
| } | |

The semantics of next_segment_address may be the same as above, while the remaining semantics may be specified as follows:

num_layer_sets_au_ending specifies the number of ls_idx_au_ending[i] syntax elements in this syntax structure.

ls_idx_au_ending[i] specifies that VCL NAL units with a nuh_layer_id value included in a layer set with index ls_idx_au_ending[i] do not follow this NAL unit within the access unit containing this SEI message.

Figure 10:
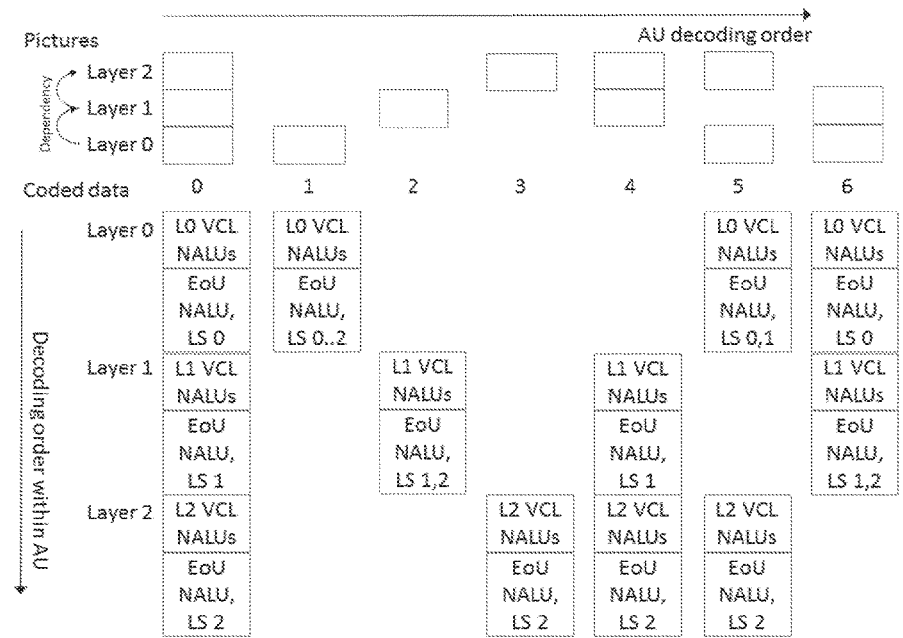
FIG. 10 shows another example bitstream encoded according to an embodiment of the invention.

FIG. 10 shows an example bitstream according to the above embodiment. The structure of the layers is similar to that of FIG. 9: three layers are encoded, where layer 1 depends on layer 0 and layer 2 depends on layer 1. Three layer sets have been specified e.g. in the VPS, layer set 0 containing layer 0, layer set 1 containing layers 0 and 1, and layer set 2 containing layers 0, 1, and 2. Herein, the second indication is referred to as "LS"; i.e. layer set indices of layer sets for which the picture unit is the last picture unit in the AU. For example, the EoU NAL units at layer 0 in AU 1 and at layer 1 in AUs 3 and 6 indicate that layer-0 picture is the last picture unit within AU 1 and layer-1 pictures are the last picture units within AUs 3 and 6. The EoU NAL unit at layer 0 in AU 5, in turn, indicates that layer-0 picture is the last picture unit within AU 5, if the layer set 1 is chosen for decoding.

According to an embodiment, the second indication takes advantage of the layer dependency information, which may be specified for example in a VPS. According to an embodiment, the second indication may comprise a greatest layer identifier value within a layer subtree and may indicate that the greatest layer identifier value and all its reference layers (with a layer identifier value greater than the layer identifier value associated with the second indication itself) may be present in the access unit. The benefit of using layer dependency information in the encoding of the second indication may be the reduced bit count compared to other embodiments.

According to an embodiment, the second indication may additionally comprise layer-wise indication(s) which layers may be present in the access unit, and/or comprise layer-wise indication(s) which layers are absent in the access unit. The layer-wise indication may be used in a case where the access unit has fewer inter-layer dependencies than the sequence wise dependency may indicate, for example when a picture of a reference layer is not present in the access unit and hence not used as an inter-layer reference picture within the access unit. For example, the following syntax may be used:

| | Descriptor |
|---|---|
| coded_unit_completion( payloadSize ) { | |
|     next_segment_address | ue(v) |
|     if( next_segment_address = = 0 ) { | |
|         num_foll_subtrees_in_au | ue(v) |
|         for( i = 0; i < num_foll_subtrees_in_au; i++ ) | |
|             subtree_greatest_layer_id[ i ] | u(6) |
|         num_foll_pic_units_in_au | ue(v) |
|         for( i = 0; i < num_foll_pic_units_in_au; i++ ) | |
|             foll_layer_id[ i ] | u(6) |
|     } | |
| } | |

The semantics of next_segment_address may be the same as above, while the remaining semantics may be specified as follows:

num_foll_subtrees_in_au specifies the number of subtree_greatest_layer_id[i] syntax elements in this syntax structure.

subtree_greatest_layer_id[i] indicates that the layers with nuh_layer_id equal to subtree_greatest_layer_id[i] may be present in the access unit and that any reference layers of the layer with nuh_layer_id equal to subtree_greatest_layer_id

[i] having nuh_layer_id greater than the nuh_layer_id value currLayerId of the current NAL unit may be present in the access unit. When present, subtree_greatest_layer_id[i] shall be greater than currLayerId. The layer with nuh_layer_id equal to subtree_greatest_layer_id[k] shall not be a reference layer of the layer with nuh_layer_id equal to subtree_greatest_layer_id[j] for any values of j and k in the range of 0 to num_foll_subtrees_in_au−1, inclusive, such that j is not equal to k.

num_foll_pic_units_in_au specifies the number of foll_layer_id[i] syntax elements in this syntax structure.

foll_layer_id[i] specifies that the layer with nuh_layer_id equal to foll_layer_id[i] may be present in the access unit.

The values of subtree_greatest_layer_id[j] for j in the range of 0 to num_foll_subtrees_in_au−1, inclusive, and foll_layer_id[k] for k in the range of 0 to num_foll_pic_units_in_au−1, inclusive, indicate that the VCL NAL units with certain values of nuh_layer_id are not present in the access unit, as specified below:

```
for( iLid = currLayerId + 1; iLid <= MaxLayersMinus1; iLid++ )
    PicUnitMayBePresentFlag[ iLid ] = 0
for( i = 0; i < num_foll_subtrees_in_au; i++ ) {
    hLid = subtree_greatest_layer_id[ i ]
    for( rIdx = 0; rIdx < NumRefLayers[ hLid ] && exitLoopFlag = = 0;
        rIdx++ ) {
        rLid = IdRefLayer[ hLid ][ rIdx ]
        if( rLid > currLayerId )
            PicUnitMayBePresentFlag[ rLid ] = 1
    }
    PicUnitMayBePresentFlag[ hLid ] = 1
}
for( i = 0; i < num_foll_pic_units_in_au; i++ )
    PicUnitMayBePresentFlag[ foll_layer_id[ i ] ] = 1
```

The access unit does not contain VCL NAL units with nuh_layer_id nuhLayerId greater than currLayerId such that PicUnitMayBePresentFlag[nuhLayerId] is equal to 0.

When there is no value within TargetDecLayerIdList that is greater than CurrLayerId and for which PicUnitMayBePresentFlag is equal to 1, the current picture unit is the last picture unit of interest for the decoder within the current access unit. This may be alternatively or additionally specified with the following pseudo-code or alike:

```
Let the number of items in TargetDecLayerIdList be numDecLayers.
currLayerLastInAuFlag = 1
for( i = 0; i < numDecLayers; i++ )
    if( TargetDecLayerIdList[ i ] > CurrLayerId &&
        PicUnitMayBePresentFlag[
TargetDecLayerIdList[ i ] ] )
            currLayerLastInAuFlag = 0
```

When currLayerLastInAuFlag is equal to 1, the current picture unit is the last picture unit of interest for the decoder within the current access unit. When currLayerLastInAuFlag is equal to 0, the current picture unit may or may not be the last picture unit of interest for the decoder within the current access unit.

Figure 11:
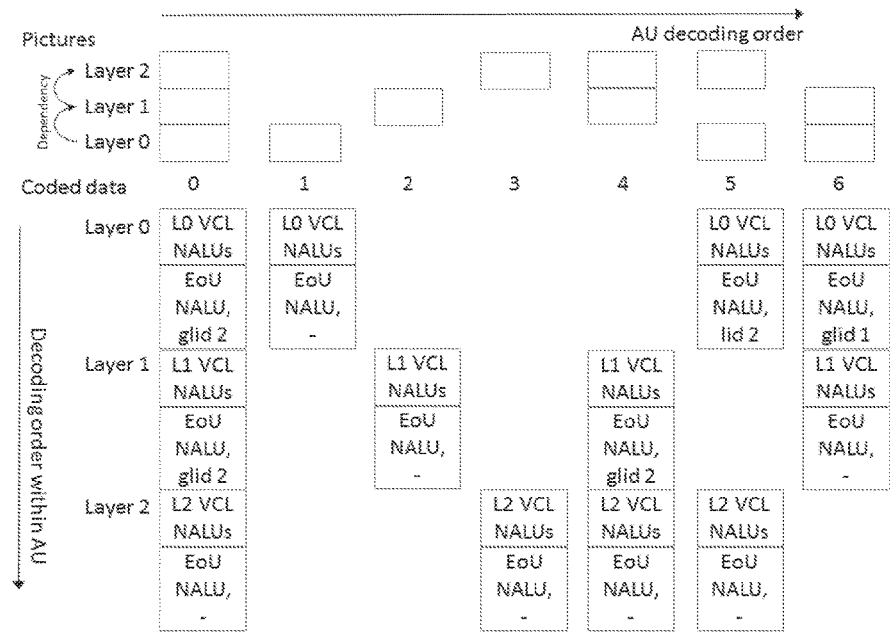
FIG. 11 shows yet another example bitstream encoded according to an embodiment of the invention.

FIG. 11 shows an example bitstream according to the embodiment. Again, three layers are encoded, where layer 1 depends on layer 0 and layer 2 depends on layer 1. Three layer sets have been specified e.g. in the VPS. As the layers have such a prediction dependency, they are in the same layer subtree. Herein, the second indication is referred to as "glid" or "lid". The abbreviation "glid" may be understood as a list of subtree_greatest_layer_id[i] values; i.e. greatest layer identifier value of a layer subtree present in the AU, and the abbreviation "lid" may be understood as a list of foll_layer_id[i] values; i.e. layer identifier value present in the AU. In many cases in this example, either foll_layer_id [i] or subtree_greatest_layer_id[i] can be used, e.g. in foll_layer_id[i] ("lid") could be used instead of subtree_greatest_layer_id[i] ("glid") in AU 6. AU 5 is an example where picture at layer 1 is absent and hence picture 2 does not use inter-layer prediction from layer 1 (but may e.g. use inter prediction within layer 2). As some pictures of the layer subtree are absent in AU 5, the layer-wise signalling is used in the EoU NAL unit at layer 0 of AU 5.

Figure 12:
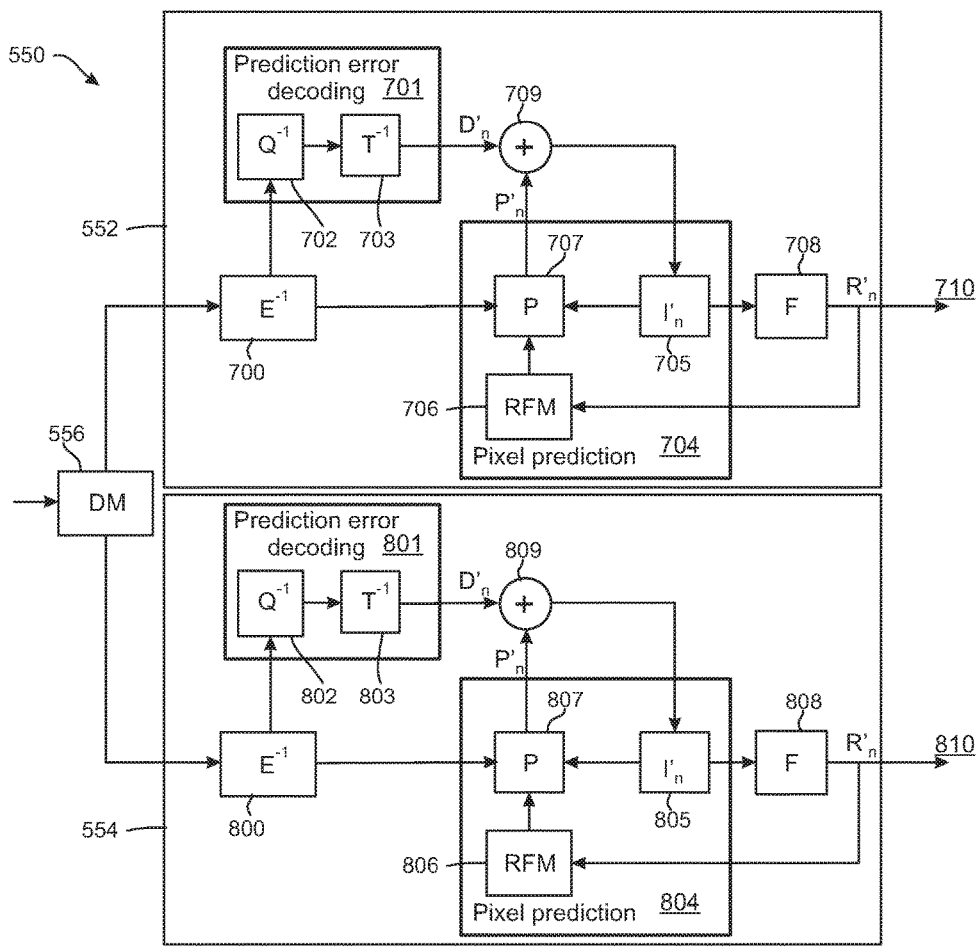
FIG. 12 shows a schematic diagram of a decoder suitable for implementing embodiments of the invention.

FIG. 12 shows a block diagram of a video decoder suitable for employing embodiments of the invention. FIG. 10 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Figure 13:
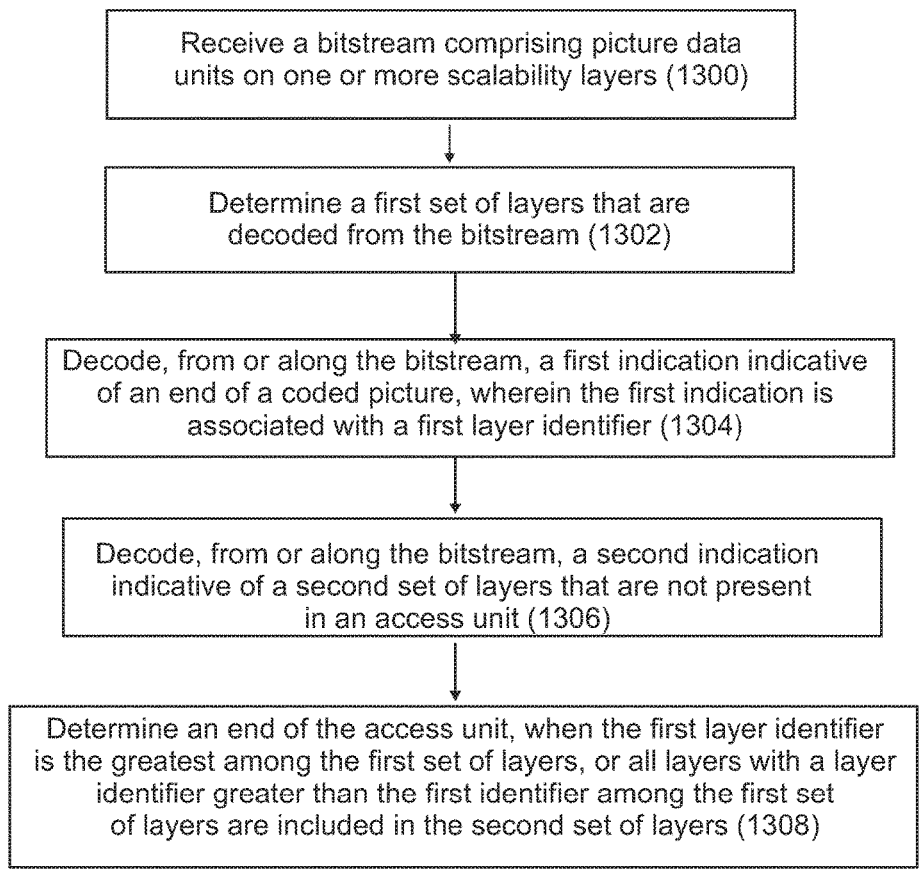
FIG. 13 shows a flow chart of a decoding method according to an embodiment of the invention.

In the decoding method, which is disclosed in FIG. 13, the decoder receives a bitstream (1300). The decoder determines (1302) a first set of layers, e.g. represented by a first set of layer identifier values, that are decoded from the bitstream. A first indication indicative of an end of a coded picture is decoded (1304) from or along the bitstream, wherein the first indication associated with a first layer identifier. Further, a second indication indicative of a second set of layers that are not present in an access unit is decoded (1306) from or along the bitstream. Then, an end of an access unit is determined (1308), when the first layer identifier is the greatest among the first set of layers, or all layers with a layer identifier greater than the first identifier among the first set of layers are included in the second set of layers.

Herein, the decoder should be interpreted to cover any operational unit capable to carry out the decoding operations, such as a player, a receiver, a gateway, a demultiplexer and/or a decoder.

The decoder may determine the first set of layers that are decoded from a bitstream, for example, based on the information on layer sets and output layer sets indicated in a video parameter set (VPS) and/or decoder capabilities. This may further include determination of necessary layers (i.e. output layers and their reference layers), e.g. based on the information provided in VPS. In the HEVC decoding process, this corresponds to providing the target output layer set index TargetOlsIdx by external means (to the decoding process) and concluding a layer identifier list TargetDecLayerIdList that includes the necessary layers of the target output layer set. The first indication indicative of an end of a coded picture (or a picture unit) is associated with a first layer identifier, e.g. the NAL unit comprising the first indication. The second indication indicative of a second set of layers that are not present in an access unit may be decoded, for example, from the same syntax structure as the first indication.

According to an embodiment, one or more layer patterns are decoded from a sequence-level syntax structure and/or group of pictures level syntax structure from or along the bitstream. The one or more layer patterns may be indexed in their appearance order in the syntax structure or an identifier may be decoded for each of the one or more layer pattern. A layer pattern may indicate a set of layer identifier values, such as nuh_layer_id values. The set of layer identifier values may indicate the layers that may be present in an access unit that is associated with the layer pattern. Alternatively or additionally, the set of layer identifier values may indicate absent layers in an access unit that is associated with the layer pattern. Additionally, an index or identifier of the layer pattern applying to (or associated with) the access unit is decoded from or along the bitstream in a manner that it is associated with the access unit, e.g. by decoding the index or identifier of the layer pattern from a syntax structure that is contained in the access unit. The second indication may be considered to comprise both the coded one or more layer patterns and the index or identifier, or it may be considered to comprise only the index or identifier.

According to an embodiment, the second indication indicates layers that may be present in the access unit. Layers that are absent can be determined as those layers that are not listed as possibly being present (and have a layer identifier value greater than that associated with the second indication itself). Additionally, some of the layers are indicated to be potentially present in the access using the second indication may be indicated to be absent by other means, such as a prior end of sequence NAL unit associated with a layer, layers not present SEI message, or some other layer discontinuity indication. The decoder decodes said other means and based on both the second indication and said other means determines the second set of layers.

According to an embodiment based on the embodiment of the previous paragraph, the decoder decodes from or along the bitstream a third indication indicative of whether a picture that is or may be present in an access unit is an IRAP picture or alike (enabling layer up-switching). The third indication may be decoded from the syntax structure also including the second indication and/or may be decoded separately from the second indication. Said other means comprises prior end of sequence NAL unit associated with a layer, layers not present SEI message, or some other layer discontinuity indication, based on which it has been determined which layers are not present prior to the present access unit. The third indication is used to conclude to which layers up-switching is possible within the present access unit, given the prior layer discontinuity information. The second set of layers therefore includes layers that have been indicated to be discontinued earlier and for which the present access unit does not contain an IRAP picture, as indicated by the third indication, or contains an IRAP picture that does not facilitate layer up-switching (i.e. some reference layers of the layer with the IRAP picture have not been decoded). If LayerInitializedFlag[layerId] is used in controlling the layer-wise start-up mechanism, the second set of layers includes layers for which LayerinitializedFlag is equal to 0 and for which the present access unit does not contain an IRAP picture or contains an IRAP picture for which some of the reference layers have LayerinitializedFlag equal to 0. The layers that may be present in the present access unit comprise i) layers that have been continuously present and decoded and may be present also in the present access unit as well as ii) layers that have been discontinued earlier but contain IRAP pictures in the present access unit and may be present in this access unit.

Figure 14:
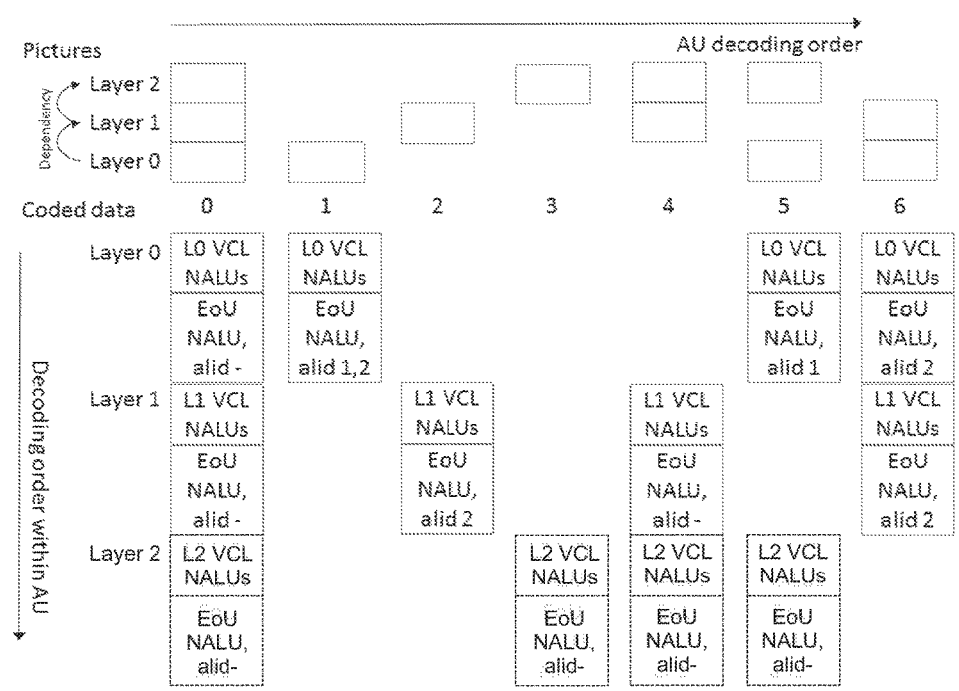
FIG. 14 shows the example bitstream of FIG. 7 decoded according to an embodiment of the invention.

An example for determining an end of an access unit, when the first layer identifier is the greatest among the first set of layers, or all layers with a layer identifier greater than the first identifier among the first set of layers are included in the second set of layers, is shown in FIG. 14. Herein, the decoder receives the bitstream encoded as disclosed in the example of FIG. 9.

In the example of FIG. 14, the decoder side determines to decode layers 0 and 1 but omit layer 2 (showing layer 2 as dimmer color). The decoder side should therefore be able to determine the end of each access unit, when layers 0 and 1 are decoded. The decoder expects to receive coded pictures of layer 0 and 1 for each access unit unless otherwise indicated by the second indication included in the EoU NAL unit. In the example of FIGS. 7 and 12, the second indication is referred to as "alid"; absent layer identifier values that are greater the current layer identifier. For example, the EoU NAL unit of AU 1 on layer 0 indicates that layers 1 and 2 are absent, hence the decoder can conclude an end of an access unit when decoding the EoU NAL unit of AU 1, since all layers included in the second set of layers have a layer identifier (1, 2) greater than the first identifier (0) among the first set of layers. The first layer identifiers (1) on layer 1 of the AUs 0 and 4 among the first set of layers, i.e. the set of layers (0, 1) that are decoded from the bitstream, in turn indicate an end of an access unit.

AU 5 is an example where prior art methods, such as the use of the marker bit of the RTP header according to RFC 6190, fail. In the prior art methods, the indication of an access unit is carried with the picture unit of layer 2, which in this example is never received or decoded, and hence the end of access unit is not detected. In the example of FIG. 12, the decoder decodes from the second indication of the EoU NAL unit at layer 0 of AU 5 that the access unit does not include a picture unit at layer 1 and hence concludes that the picture unit at layer 0 is the last picture unit in the access unit in a situation where only layers 0 and 1 are decoded.

Referring back to the example bitstream shown in FIG. 8, where the second indication is referred to as "LS"; layer set indices of layer sets for which the picture unit is the last picture unit in the AU, a decoder or a gateway may choose to operate at a certain output layer set (corresponding to a certain layer set) or at a certain layer set. For example, if the decoder side determines to decode layers 0 and 1 but omit layer 2, thus choosing layer set 1, the EoU NAL units at layer 0 in AUs 1 and 5 indicate that the layer-0 picture unit is the last picture unit within the access unit when layer set 1 is in use. Hence, the end of an access unit can be determined immediately after the picture unit at layer 0 in AUs 1 and 5.

It needs to be understood that the determination of the end of an access unit according to the embodiments may be regarded as the determination of the last picture unit or coded picture that needs to be decoded from the access when the decoder operates with a certain target output operation point, a certain target output layer set (e.g. as identified by the TargetOlsIdx variable in HEVC), with a certain target layer set, or with a certain set of necessary layers. The access unit may contain such picture units or coded pictures that follow the picture unit or coded picture determined to be the end of an access unit and that are not needed for the decoding of the target output operation point, the target output layer set, or the target layer set, or do not belong to layers among the necessary layers.

It needs to be understood that the determination of the end of an access unit according to the embodiments may be regarded as the determination of the last picture unit or coded picture that is present in an access unit, when the access unit has been subject to sub-bitstream extraction or alike that removes the layers not included in a certain target output operation point, in a certain target output layer set (e.g. as identified by the TargetOlsIdx variable in HEVC), in a certain target layer set, or among the necessary layers.

The determination of the end of an access unit according to the embodiments may be utilized in several purposes, e.g. in one or more of the following:

Providing the access unit to the decoding process.

Performing early marking of pictures as "unused for reference".

Determining whether picture(s) from alternative output layers are output and which alternative output layer(s) include pictures that are to be output.

In an embodiment, the end of an access unit is determined according to any other embodiment, and as response to said determination the access unit is decoded.

In an embodiment, the end of an access unit is determined according to any other embodiment, and as response to said determination each sub-layer non-reference picture of the access unit with TemporalId equal to the highest TemporalId that is being decoded is marked as "unused for reference".

In an embodiment, the end of an access unit is determined according to any other embodiment, and as response to said determination it is inspected if decoded pictures of the access unit from all output layers are available and intended for output from the decoding process. If one or more pictures of output layers are not available or are not intended for output, it is determined if and which pictures from alternative output layer(s) are output. Said inspection and/or said determination if and which pictures from alternative output layer(s) are output may be performed as described earlier with the description of the alternative output layer mechanism.

As becomes evident, the determination of the end of access unit according to the embodiments provides an earlier indication of when the access unit is complete within the access unit itself. This has at least one or more of the following benefits:

A lower decoding latency is achieved in decoder side implementations where an access unit is received completely before its decoding is started.

A lower latency on determining output layers is achieved, when the alternative output layer mechanism is in use. This mechanism is applied after an access unit is completely decoded.

A lower latency on marking of pictures can be achieved, when an early marking mechanism triggered by the end of an access unit is in use. This may reduce the memory consumption used for storing decoded pictures.

Figure 15:
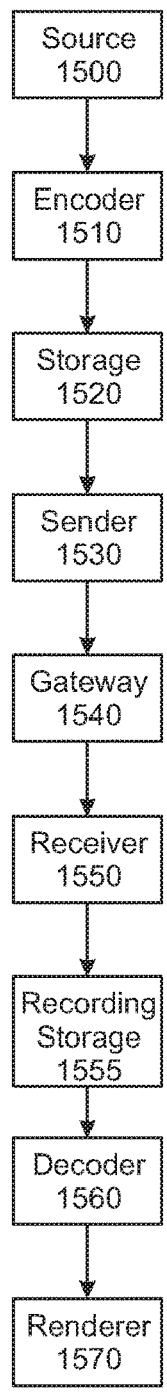
FIG. 15 shows a schematic diagram of an example multimedia communication system within which various embodiments may be implemented.

FIG. 15 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 1540 may or may not be connected to a gateway 1550 through a communication network. The gateway may also or alternatively be referred to as a middle-box. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1550 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1550 may be called an RTP mixer or an RTP translator and may act as an endpoint of an RTP connection. Instead of or in addition to the gateway 1550, the system may include a splicer which concatenates video sequence or bitstreams.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform bitrate adaptation, and/or a sender 1540 and/or a gateway 1550 may be configured to select the transmitted layers and/or sub-layers of a scalable video bitstream. Bitrate adaptation and/or the selection of the transmitted layers and/or sub-layers may take place for multiple reasons, such as to respond to requests of the receiver 1560 or prevailing conditions, such as throughput, of the network over which the bitstream is conveyed. A request from the receiver can be, e.g., a request for a change of transmitted scalability layers and/or sub-layers, or a change of a rendering device having different capabilities compared to the previous one. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple layer up-switching and layer down-switching operations taking place in various orders.

A decoder 1580 may be configured to perform bitrate adaptation, and/or a decoder 1580 may be configured to select the transmitted layers and/or sub-layers of a scalable video bitstream. Bitrate adaptation and/or the selection of the transmitted layers and/or sub-layers may take place for multiple reasons, such as to achieve faster decoding operation. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, example embodiments have been described in the context of multi-layer HEVC extensions, such as SHVC and MV-HEVC. It needs to be understood that embodiments could be similarly realized in any other multi-layer coding scenario.

In the above, some embodiments have been described using MV-HEVC, SHVC and/or alike as examples, and consequently some terminology, variables, syntax elements, picture types, and so on specific to MV-HEVC, SHVC and/or alike have been used. It needs to be understood that embodiments could be realized with similar respective terminology, variables, syntax elements, picture types, and so on of other coding standards and/or methods. For example, in the above, example embodiments have been described where layer identifiers use a syntax element of type u(6). It needs to be understood that other types may be used similarly, such as variable-length coding using ue(v). It also needs to be understood that layer identifiers may be differentially coded, e.g. relative to the layer identifier value associated with the second indication itself (e.g. the nuh_layer_id value of the NAL unit containing the second indication) and/or the previous layer identifier values indicated in the same syntax structure. It is noted that the previous layer identifier values in the same syntax structure may themselves be differentially coded, and their value may need to be resolved prior to resolving later differentially coded layer identifier values in the same syntax structure. It needs to be understood that embodiments could be realized with any other indications, syntax elements, and/or variables for a layer identifier and/or a sub-layer identifier, respectively.

SVC is more constrained than multi-layer HEVC extensions, when it comes to the constraints on the presence of dependency representations and layer representations. Basically, all access units shall have the same dependency representations present throughout a coded video sequence, i.e. the coded video data with the same values of dependency_id shall appear in each access unit. The number of layer representations is allowed to vary, i.e. the number of quality_id values per particular dependency_id value may vary within a coded video sequence. In an embodiment applicable to SVC or a similar codec, the second indication is indicative of the quality_id values the layer representations that are not present in a dependency representation associated with the second indication. This embodiment enables the determination when a dependency representation is complete, i.e. when no coded data for dependency representation follows. In an embodiment, the dependency representation can be passed to the decoding process as a consequence of said determination.

In HEVC, the end-of-bitstream (EOB) NAL unit is required to have nuh_layer_id equal to 0. When present, an EOB NAL unit is required to be the last NAL unit of an access unit. When a bitstream is transmitted over several logical channels, e.g. one layer per a logical channel, the EOB NAL unit is conveyed in the lowest logical channel, i.e. that containing the base layer. When the receiver side re-aggregates an access unit from data received from several logical channels, special attention needs to be taken for the handling of EOB NAL units, as they need to be located last in the access unit. It would be desirable to avoid the special handling of EOB NAL units and instead re-aggregate an access unit by concatenating data from logical channels in sequential order, i.e. all data of an access unit from the lowest logical channel followed by all data of an access unit from the second lowest logical channel, and so on. In an embodiment, the EOB NAL unit may be include the second indication indicative of a second set of layers that are not present in an access unit. Any presented example embodiment or alike may be used for the second indication. For example, the layer identifier values of the layers that are not present in the access unit and that are greater than the layer identifier value associated with the second indication itself may be listed in the EOB NAL unit.

In an embodiment, an end of sequence (EOS) NAL unit with layer identifier (nuh_layer_id) greater than 0 is used for indicating the end of CVS rather than layer discontinuity, as explained earlier. Layer discontinuity may be indicated by other means, such as a specific DOL NAL unit or using the layers not present SEI message or alike. The EOS NAL unit may be include the second indication indicative of a second set of layers that are not present in an access unit. Any presented example embodiment or alike may be used for the second indication. For example, the layer identifier values of the layers that are not present in the access unit and that are greater than the layer identifier value associated with the second indication itself may be listed in the EOS NAL unit. Similarly to determining an end of bitstream above, the decoder side may determine an end of sequence (i.e. CVS) using EOS NAL units including or associated with the second indication (in place of EOB NAL units).

In the above, some embodiments have been described with reference to the term scalable video coding, decoding, and/or bitstreams. It needs to be understood that the word "scalable" may but does not necessarily infer an inter-layer prediction relation. Embodiments could be equivalently be described with reference to the term multi-layer video coding, decoding and/or bitstreams Vice versa, in the above some embodiments have been described with reference to the term multi-layer video coding, decoding and/or bitstreams, while embodiments could be equivalently described with reference to the term scalable video coding, decoding and/or bitstreams.

In the above, some embodiments have been described with reference to the term picture unit. It needs to be understood that the embodiments could be similarly described with reference to the term coded picture, the term coded frame, or any term with similar meaning.

In the above, some embodiments have been described with reference to a suffix SEI NAL unit. It needs to be understood that embodiments could be similarly realized with reference to a prefix SEI NAL unit, or an SEI NAL unit that can either precede or follow an associated NAL unit in decoding order, or an SEI syntax structure or alike that is contained by another syntax structure, such as a picture header and/or a slice header.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
receiving a bitstream comprising picture data units on one or more scalability layers;
determining a first set of layers of an access unit that are decoded from the bitstream while omitting one or more other encoded layers of the access unit that were received from the bitstream from decoding;
decoding, from or along the bitstream, a first indication indicative of an end of a coded picture, wherein the first indication is associated with a first layer identifier;
decoding, from or along the bitstream, a second indication indicative of a second set of layers that are not present in the access unit; and
determining an end of the access unit in order to transition to a next access unit without decoding the one or more other encoded layers of the access unit, wherein determining the end of the access unit comprises determining the end of the access unit when the first layer identifier is the greatest among the first set of layers and, in an instance in which the first layer identifier is not the greatest among the first set of layers, determining the end of the access unit when all layers with a layer identifier greater than the first layer identifier among the first set of layers are included in the second set of layers.

2. The method according to claim 1, wherein the first indication and the second indication are decoded from different syntax structures.

3. The method according to claim 1, the method further comprising decoding the first indication from a specific NAL unit or an SEI message in a suffix SEI NAL unit.

4. The method according to claim 1, the method further comprising decoding the second indication from one or more of the following syntax structures:
a specific NAL unit;
an SEI message;
a VCL NAL unit syntax structure;
an access unit delimiter NAL unit; or
a picture header syntax structure.

5. The method according to claim 1, the method further comprising
    decoding the second indication as indicating layers that may be present in the access unit; and
    determining absent layers as those layers that not listed as allowed to be present and having a layer identifier value greater than that associated with the second indication.

6. The method according to claim 5, wherein interpretation of the second indication depends on the information in the video parameter set.

7. The method according to claim 1, wherein the end of an access unit is determined as a response to determining that each sub-layer non-reference picture of the access t with TemporalId is equal to the highest TemporalId that is being decoded is marked as "unused for reference".

8. An apparatus comprising:
    at least one processor and at least one memory, said at least one memory stored with code thereon, which when executed by said at least one processor, causes an apparatus to perform at least
        receiving a bitstream comprising picture data units on one or more scalability layers;
        determining a first set of layers of an access unit that are decoded from the bitstream while omitting one or more other encoded layers of the access unit that were received from the bitstream from decoding;
        decoding, from or along the bitstream, a first indication indicative of an end of a coded picture, wherein the first indication is associated with a first layer identifier;
        decoding, from or along the bitstream, a second indication indicative of a second set of layers that are not present in the access unit; and
        determining an end of the access unit in order to transition to a next access unit without decoding the one or more other encoded layers of the access unit, wherein determining the end of the access unit comprises determining the end of the access unit when the first layer identifier is the greatest among the first set of layers and, in an instance in which the first layer identifier is not the greatest among the first set of layers, determining the end of the access unit when all layers with a layer identifier greater than the first layer identifier among the first set of layers are included in the second set of layers.

9. The apparatus according to claim 8, further comprising code causing the apparatus to decode the first indication and the second indication from different syntax structures.

10. The apparatus according to claim 8, further comprising code causing the apparatus to
    decode the second indication as indicating layers that may be present in the access unit; and
    determine absent layers as those layers that not listed as allowed to be present and having a layer identifier value greater than that associated with the second indication, wherein interpretation of the second indication depends on the information in the video parameter set.

11. The apparatus according to claim 8, further comprising code causing the apparatus to determine the end of an access unit as a response to determining that each sub-layer non-reference picture of the access unit with TemporalId is equal to the highest TemporalId that is being decoded is marked as "unused for reference".

12. A non-transitory computer readable storage medium stored with code thereon for use by an apparatus, which when executed by a processor, causes the apparatus to perform:
    receiving a bitstream comprising picture data units on one or more scalability layers;
    determining a first set of layers of an access unit that are decoded from the bitstream while omitting one or more other encoded layers of the access unit that were received from the bitstream from decoding;
    decoding, from or along the bitstream, a first indication indicative of an end of a coded picture, wherein the first indication is associated with a first layer identifier;
    decoding, from or along the bitstream, a second indication indicative of a second set of layers that are not present in the access unit; and
    determining an end of the access unit in order to transition to a next access unit without decoding the one or more other encoded layers of the access unit, wherein determining the end of the access unit comprises determining the end of the access unit when the first layer identifier is the greatest among the first set of layers and, in an instance in which the first layer identifier is not the greatest among the first set of layers, determining the end of the access unit when all layers with a layer identifier greater than the first layer identifier among the first set of layers are included in the second set of layers.

13. A method comprising:
    encoding a coded picture as a part of an access unit into a bitstream;
    encoding a first indication indicative of an end of the coded picture into or along the bitstream, wherein the first indication is associated with a first layer identifier; and
    encoding a second indication indicative of a second set of layers that are not present in the access unit into or along the bitstream,
    wherein encoding the coded picture comprises encoding a first set of layers of the access unit into the bitstream and encoding at least one other layer of the access unit into the bitstream, wherein encoding the coded picture comprises providing an indication of an end of the access unit with the first layer identifier in an instance in which the first layer identifier is the greatest among the first set of layers and, in an instance in which the first layer identifier is not the greatest among the first set of layers, by providing that all layers with a layer identifier greater than the first layer identifier among the first set of layers are included in the second set of layers to permit the at least one other layer of the access unit to be distinguished and omitted from decoding.

14. The method according to claim 13, wherein the first indication and the second indication are included in different syntax structures.

15. The method according to claim 13, the method further comprising
    encoding the second indication to indicate layers that may be present in the access unit; and
    determining absent layers as those layers that not listed as allowed to be present and having a layer identifier value greater than that associated with the second indication, wherein interpretation of the second indication may depend on the information in the video parameter set.

16. The method according to claim 13, wherein the end of an access unit is determined as a response to determining that each sub-layer non-reference picture of the access unit with TemporalId is equal to the highest TemporalId that is being encoded is marked as "unused for reference".

17. An apparatus comprising:
- at least one processor and at least one memory, said at least one memory stored with code thereon, which when executed by said at least one processor, causes an apparatus to perform at least
- encoding a coded picture as a part of an access unit into a bitstream;
- encoding a first indication indicative of an end of the coded picture into or along the bitstream, wherein the first indication is associated with a first layer identifier; and
- encoding a second indication indicative of a second set of layers that are not present in the access unit into or along the bitstream,
- wherein encoding the coded picture comprises encoding a first set of layers of the access unit into the bitstream and encoding at least one other layer of the access unit into the bitstream, wherein encoding the coded picture comprises providing an indication of an end of the access unit with the first layer identifier in an instance in which the first layer identifier is the greatest among the first set of layers and, in an instance in which the first layer identifier is not the greatest among the first set of layers, by providing that all layers with a layer identifier greater than the first layer identifier among the first set of layers are included in the second set of layers to permit the at least one other layer of the access unit to be distinguished and omitted from decoding.

18. The apparatus according to claim 17, further comprising code causing the apparatus to encode the first indication and the second indication in different syntax structures.

19. The apparatus according to claim 17, further comprising code causing the apparatus to determine the end of an access unit as a response to determining that each sub-layer non-reference picture of the access unit with TemporalId is equal to the highest TemporalId that is being encoded is marked as "unused for reference".

20. A non-transitory computer readable storage medium stored with code thereon for use by an apparatus, which when executed by a processor, causes the apparatus to perform:
- encoding a coded picture as a part of an access unit into a bitstream;
- encoding a first indication indicative of an end of the coded picture into or along the bitstream, wherein the first indication is associated with a first layer identifier; and
- encoding a second indication indicative of a second set of layers that are not present in the access unit into or along the bitstream,
- wherein encoding the coded picture comprises encoding a first set of layers of the access unit into the bitstream and encoding at least one other layer of the access unit into the bitstream, wherein encoding the coded picture comprises providing an indication of an end of the access unit with the first layer identifier in an instance in which the first layer identifier is the greatest among the first set of layers and, in an instance in which the first layer identifier is not the greatest among the first set of layers, by providing that all layers with a layer identifier greater than the first layer identifier among the first set of layers are included in the second set of layers to permit the at least one other layer of the access unit to be distinguished and omitted from decoding.

* * * * *